United States Patent

Ono et al.

[11] Patent Number: 6,005,844
[45] Date of Patent: Dec. 21, 1999

[54] INFORMATION COLLECTION DEVICE AND METHOD FOR USE WITH COMMUNICATIONS NETWORKS

[75] Inventors: Hideaki Ono; Ryuichi Takechi; Tsuguo Kato; Yutaka Ezaki; Mitsuharu Amano, all of Kanagawa, Japan

[73] Assignee: Fujitsu Limited, Kanagawa, Japan

[21] Appl. No.: 08/978,020

[22] Filed: Nov. 25, 1997

Related U.S. Application Data

[62] Division of application No. 08/516,956, Aug. 18, 1995, Pat. No. 5,790,525.

[30] Foreign Application Priority Data

Oct. 3, 1994 [JP] Japan .................................. 6-238902

[51] Int. Cl.[6] .................................................. H04L 12/14
[52] U.S. Cl. ................................................ 370/253; 370/395
[58] Field of Search ............................... 370/242, 244, 370/248, 250, 252, 253, 395, 396, 397; 379/114

[56] References Cited

U.S. PATENT DOCUMENTS

| | | |
|---|---|---|
| 5,239,537 | 8/1993 | Sakauchi . |
| 5,265,088 | 11/1993 | Takigawa et al. . |
| 5,315,580 | 5/1994 | Phaal . |
| 5,321,688 | 6/1994 | Nakano et al. . |
| 5,394,408 | 2/1995 | Nishihara et al. . |
| 5,461,607 | 10/1995 | Miyagi et al. . |
| 5,475,696 | 12/1995 | Taniguchi . |
| 5,623,405 | 4/1997 | Isono ........................................ 370/397 |

FOREIGN PATENT DOCUMENTS

| | | |
|---|---|---|
| 61-163494 | 7/1961 | Japan . |
| 5-37545 | 2/1993 | Japan . |

*Primary Examiner*—Chau Nguyen
*Attorney, Agent, or Firm*—Helfgott & Karas, P C.

[57] ABSTRACT

A storage unit includes an alarm state/timer table, an alarm state table, an alarm state OR-representation table, an alarm state change OR-representation table, an alarm state latch circuit, and a statistical information memory. A collection unit extracts the identifier and data from a cell that passes through a switching unit. An update unit updates associated data in the storage unit. A readout unit reads the updated data and sends it to a call processing processor. An address generation section selectively generates the address for data needing to be updated. An adjustment section forces the readout unit to wait until a cell slot arrives in which no data is updated.

6 Claims, 34 Drawing Sheets

An : ALARM STATE OF ATM CONNECTION n

| ADDRESS | 0 | 1 | 2 | .. |
|---|---|---|---|---|
| | A0 | A8 | | .. |
| | A1 | A9 | | .. |
| | A2 | A10 | | .. |
| | A3 | A11 | | |
| | A4 | A12 | | |
| | A5 | A13 | | |
| | A6 | A14 | | |
| | A7 | A15 | | .. |

FIG. 13

| I 1 | I 2 | O 1 |
|---|---|---|
| 0 | 0 | 0 |
| 1 | 0 | 0 |
| 0 | 1 | 1 |

FIG. 30

| I3 | I4 | I5 | O2 | O3 |
|----|----|----|----|----|
| 0  | 0  | 0  | 0  | 0  |
| 1  | 0  | 0  | 0  | 0  |
| 0  | 1  | 0  | 0  | 1  |
| 0  | 0  | 1  | 1  | 0  |

FIG. 31

| I6 | I7 | I8 | I9 | O4 | O5 |
|----|----|----|----|----|----|
| 0  | 0  | 0  | 0  | 0  | 0  |
| 1  | 0  | 0  | 0  | 0  | 0  |
| 0  | 1  | 0  | 0  | 0  | 1  |
| 0  | 0  | 1  | 0  | 1  | 0  |
| 0  | 0  | 0  | 1  | 1  | 1  |

FIG. 34

INFORMATION COLLECTION DEVICE AND METHOD FOR USE WITH COMMUNICATIONS NETWORKS

This application is a divisional of application Ser. No. 08/516,956, filed Aug. 18, 1995 now U.S. Pat. No. 5,790,525.

BACKGROUND OF THE INVENTION

1. Field of the Invention

The present invention relates to an information collection device and method, used with a communications network for transmitting cells containing data, and for collecting information for each connection which is set up on the communications network. More particularly, the present invention relates to an information collection device and method for collecting information on the states and characteristics of connections in a communications network using the ATM (Asynchronous Transfer Mode) switching technology.

2. Description of the Related Art

ATM switching, which constitutes the nucleus of broadband ISDNs (Integrated Services Digital Networks), that are the next generation of communications networks, is a technology that transfers all information in packets of a set length, called cells, over a communications network and enables high-speed information transfer.

In an ATM network, a VPI (Virtual Path Identifier) or VCI (Virtual Channel Identifier) in the header of a cell to be transmitted specifies a virtual connection (ATM connection) to which that cell belongs and the cell routing control is performed for each ATM connection.

ATM connections include VP connections identified by VPIs and VC connections identified by VPIs and VCIs.

A communications network utilizing the ATM switching technology has, as one of its important functions, an OAM (Operation, Administration and Maintenance) function of supervising failures in the network and/or monitoring the performance of the network. Cells that carry the OAM information on the ATM network are referred to as OAM cells.

OAM cells used to supervise network failures include AIS (Alarm Indication Signal) cells and RDI (Remote Defect Indication) cells. The AIS cells or RDI cells are generated in the event that a failure occurs in the protocol ATM layer.

For example, in the AIS-cell-based supervision of ATM layer failures, the transition from the alarm to the defective state will occur when a single AIS cell is received. Return is made to the normal state when no alarm cell is received for three seconds in succession or when a user cell is received. In the latter case, the user cell serves as a cell which makes a recovery from the alarm state to the normal state. It is required to notify a call processing processor in the ATM switching unit of whether the alarm state is either in the failed state or the normal state.

OAM cells used to monitor the network's performance include PM (Performance Management) cells. ATM-network data collection devices for measuring the characteristics of ATM-connections include ATM-connection quality measuring devices and ATM-cell accounting devices.

The ATM-network data collection device, which measures the characteristics of ATM cells coming in or going out from the ATM switching unit, determines the cell characteristics from cells coming in the collection device and updates statistical information. The collection device has a function of transferring the contents of the statistical information to the call processing processor when so requested by it.

The ATM connection quality measuring device collects information about the number of discarded cells, the number of passing cells, the number of bit errors, etc., to make measurement of the quality of ATM connections. The ATM cell accounting device counts the number of cells coming into the ATM switching unit and the number of cells discarded in the switching unit for each ATM connection.

In FIG. 1, which illustrates, in block diagram form, a conventional ATM network data collection device, a connection identification circuit 1 detects connection identifiers corresponding to addresses of network data to be updated in a statistical information memory 7 from incoming cells. A network data collection circuit 3 collects or computes data used for updating from the incoming cells.

The statistical information memory 7 retains network data. A network data update circuit 6 adds network data stored in that address in the statistical information memory 7 which is indicated by the connection identification circuit 1 and an output of the network data collection circuit 3 at the time a cell arrives.

A processor interface circuit 2 reads the contents of the statistical information memory 7 in response to a data readout request by a line control processor or call processing processor. An address selector 4 selects either of outputs of the connection identification circuit 1 and the processor interface circuit 2 as an access address in the information memory 7. A data selector 5 selects either of outputs of the network data update circuit 6 and the processor interface circuit 2 as data to be written into the statistical information memory 7.

FIG. 2 shows a configuration of the statistical information memory 7 when the ATM network data collection device of FIG. 1 is adapted to count the number of passing cells for each VPI by way of example. In the memory of FIG. 2, information on the number of passing cells for which VPI=i is stored in the address i.

Upon receipt of an incoming cell, the connection identification circuit 1 latches its VPI. At this point, the address selector 4 selects the output of the connection identification circuit 1, whereby the number of passing cells is read from that address in the memory 7 which is indicated by the VPI output from the connection identification circuit.

The network data update circuit 6 increments the number of passing cells read from the memory 7 by one and then writes the result into the memory 7 via the data selector 5.

When the processor interface circuit 2 receives a request for readout by the line control processor or call processing processor, it creates a read address. At this point, the address selector 4 selects the output of the processor interface circuit 2, so that the number of passing cells is read from the memory 7. The processor interface circuit 2 then sets the number of passing cells to zero and writes it into the memory 7. Thereby, the information on the number of passing cells read from the memory is cleared to zero (zero clear function).

Thus, the conventional ATM network data collection device is required to make four types of accesses to the statistical information memory 7: the reading out of statistical information at the arrival of a cell, the writing in of updated statistical information, the reading out of statistical information when a processor makes a request for information readout, and the clearing of statistical information to zero In the conventional ATM network data collection device, in order to avoid the competition between a memory update request at the arrival of a cell and a memory readout request by the call processing processor, the interval of time during which one cell passes (one cell slot) is generally divided into four subintervals (subslots) as shown in FIG. 3. In each subslot, a corresponding one of the four types of memory accesses is made.

A device that supervises alarm cells (AIS cells, RDI cells) is essential for the spread of the broadband ISDN. However, there is no precedent for such a device. Therefore, it is required to provide a device which uses predetermined transition conditions to manage the alarm state and to notify the call processing processor in the ATM switching unit.

For that purpose, it is required to provide a memory which holds an alarm state for each ATM connection and a memory which holds timer values by counting an alarm cell non-receiving interval of three seconds that is a condition for recovery from the alarm state, which will increase the amount of memory hardware required.

To measure each non-receiving interval accurately, the pulse unit time must be divided into a large number of subperiods on which time count is made (the timer value is incremented by one for each subperiod). The timer values for all the ATM connections that have been set must be updated during each subperiod. If, therefore, the number of ATM connections increases greatly, then each subperiod will have to be made long enough to accommodate all the ATM connections. This will make a large error in the measurement of the unreceiving interval.

When each of the ATM connection alarm states is stored in sequence in the memory address direction, only one ATM connection alarm state is presented to the call processing processor in the ATM switching unit by a single read operation.

In the event that a certain ATM connection goes into the failed state, it is required to notify the call processing processor of which connection is in the failed state. However, if a large number of connections have been set, it will require a large amount of processing time to read the alarm states of all the connections. In this case, the alarm states of connections that are in the normal state must also be read, involving wasted time. Thus, the call processing processor will require an appreciable amount of time in order to assess the alarm states of all the ATM connections.

In addition, the conventional ATM network data collection device has the following problems. Although the ATM network data collection device of FIGS. 2 and 3 has been described as collecting a single type of statistical information (the number of passing cells), the statistical information to be collected generally involves more than one item. In general, it is thus required to update more than one item of statistical information at the arrival of one cell.

Assuming here that statistical information includes items (a), (b), etc., one-cell passing interval (the interval of one cell) is divided into such memory access cycles as shown in FIG. 4. In FIG. 4, the number of memory access cycles within one cell interval is four times the number of items corresponding to the four types of accesses shown in FIG. 3.

Here, the basic ATM cell processing rate is 156 Mbps (megabytes per second) or 622 Mbps, and one cell is 53 bytes (54 bytes) long. Therefore, the one cell interval is about 2.7 microseconds (in the case of 156 Mbps) or about 675 nanoseconds (in the case of 622 Mbps). In an ATM network data collection device intended to collect more than one item of statistical information, such memory accesses as shown in FIG. 4 must be carried out within one cell interval.

Since there is a lower limit on a single memory access cycle, the number of times within one cell interval the memory access is made is limited spontaneously. For example, supposing one memory access cycle to be 75 ns in a 622-Mbps interface, the maximum number of accesses possible within one cell interval will be nine. Since the number of memory accesses within one cell interval is four times the number of statistical information items, the number of items in this case will be limited to two or less.

With the conventional memory access method as shown in FIG. 4, one cell interval is divided into memory cycles, the number of which is four times the number of statistical information items. Depending on incoming cells, therefore, time slots for updating will also be allocated to items which need not be updated. Therefore, useless time slots which are not needed will be produced.

SUMMARY OF THE INVENTION

It is an object of the present invention to provide a device and method for use with a communications network for transmitting cells containing data, which collect information in an efficient manner for each connection which is set up on the communications network. More specifically, the object of the present invention is to hold information on the state and characteristics of each connection on an ATM network at low cost and in an efficient manner, and to present this information quickly to a call processing processor.

An information collection device of the present invention is a device which monitors a communications network for failures by the use of communications cells that pass through a switching unit, and comprises a storage unit for storing first information about failures in the communications network for each of the connections set up on the communications network, a collection unit for identifying the identifier associated with an incoming cell and extracting second information about the incoming cell, an update unit for updating the first information using the second information extracted by the collection unit, and a readout unit for reading the updated first information from the storage unit.

According to another aspect, the information collection device is a device which collects and holds information about communications cells that pass through a switching unit in a communications network, and comprises a storage unit for storing first information consisting of two or more data items about an incoming cell for each of the connections set up on the communications network, a collection unit for identifying the connection associated with the incoming cell and extracting second information about the incoming cell, an update unit for selecting one data item needing to be updated from the first information stored in the storage unit on the basis of the connection identified and the second information extracted by the collection unit and the one data item using the second information, and a readout unit for reading the first information from the storage unit.

According to still another aspect, the information collection device of the present invention is a device which collects and holds information about communication cells that pass through a switching unit in a communications network, and comprises a storage unit for storing first information about communications cells that pass through the switching unit for each of the connections set up on the communications network, a collection unit for identifying the connection associated with an incoming cell and extracting second information about the incoming cell, an update unit for, when the first information in the storage unit needs to be updated, updating the first information using the second information extracted by the collection unit, and a readout unit for, when the update unit updates the first information within the time interval of the incoming cell, reading the first information from the storage unit outside this time interval.

According to a further aspect of the present invention, a method of monitoring a communications network for failures by the use of communications cells that pass through a switching unit comprises the steps of storing first information about failures in the communications network for each of the connections set up on the communications network, identifying the connection associated with an incoming cell, extracting second information about the incoming cell, updating the first information using the second information, and reading the updated first information.

According to a still further aspect of the present invention, a method of collecting information about communications cells that pass through a switching unit in a communications network comprises the steps of storing first information consisting of two or more data items about cells that pass through the switching unit for each of the connections set up on the communications network, identifying the connection associated with an incoming cell, extracting second information about the incoming cell, selecting one data item needing to be updated from the first information on the basis of the connection and the second information, updating the one data item using the second information, and reading the updated first information.

According to a further aspect, a method of collecting information about communications cells that pass through a switching unit in a communications network comprises the steps of storing first information about cells that pass through the switching unit for each of the connections set up on the communications network, identifying the connection associated with an incoming cell, extracting second information about the incoming cell, updating the first information using the second information when the first information needs to be updated, and reading, when the first information is updated within a time interval required for the incoming cell to pass through the switching unit, the first information outside this time interval.

According to the present invention, the first information stored for each of the connections set up on the communications network is updated on the basis of the second information about the incoming cell. The second information includes a connection identifier and a data update request, which can be used to specify a storage location for data on the connection identified by the identifier. Thus, only data that needs to be updated can be updated selectively. Since there is no need of making access to data that need not be updated, information in the communications network can be collected and updated in an efficient manner.

In addition, the number of processes, such as reading, updating, etc., in the interval of one cell can be reduced because access is permitted only to data that need be updated. The one cell interval can be effectively divided into time slots for processing without producing waste time slots among them.

BRIEF DESCRIPTION OF THE DRAWINGS

FIG. 13 shows a configuration of the alarm state table of FIG. 10;

FIGS. 30 and 31 show input/output values of the encoders in FIG. 29;

FIG. 34 shows input/output values of the encoders in FIG. 33.

DETAILED DESCRIPTION OF THE PREFERRED EMBODIMENTS

The present invention is directed to an information collection device which collects information on cells for each connection set up on a communications network transmitting cells containing data and a method therefore.

Figure 5:
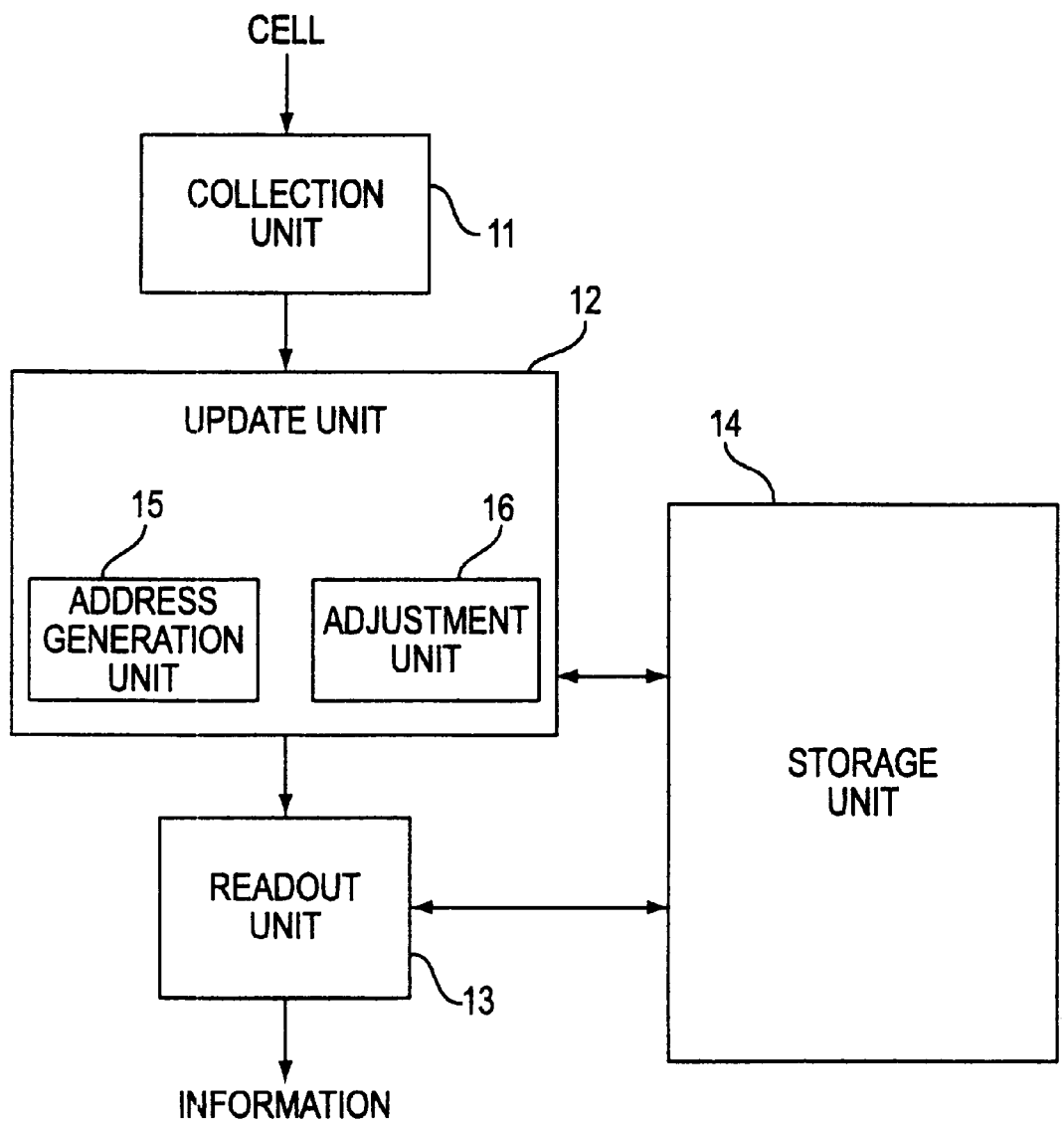
FIG. 5 is a basic block diagram of the present invention.

FIG. 5 is a basic block diagram of an information collection device according to the present invention. This device is equipped with a collection unit 11, an updating unit 12, a readout unit 13, and a storage unit 14.

The storage unit 14 stores first information about cells that pass through a switching unit in a communications network for each connection set up on the network.

Here, the connection refers to a virtual connection set up on the communications network, which, in ATM communications, is identified by VPI, or VPI and VCI.

The collection unit 11 identifies a connection to which an incoming cell belongs, to extract second information on that cell. The update unit 12 updates the first information stored in the storage unit 14 by the use of the second information extracted by the collection unit.

The readout unit 13 responds to a request by a processor associated with a switching unit to read the updated first information from the storage unit 14. A processor associated with a switching unit is a call processing processor, by way of example.

When the information device of FIG. 5 collects information on communications network failures, the storage unit 14 holds, as the first information, an alarm state being either of a failed state indicating that there is a failure associated with a connection on the communications network and a normal state indicating that there is no failure.

Upon receipt of a cell making notification that a failure has occurred in a connection, the update unit 12 writes, as second information, a failed state into the alarm state associated with that connection in the storage unit 14.

The storage unit 14 has an alarm state/timer table memory which holds, in one storage location as the first information, an alarm state and a timer value for counting an interval of time during which the alarm state is in the failed state.

The update unit 12 updates the timer value and, when the timer value for a connection becomes a predetermined value, changes the alarm state associated with that connection to the normal state.

The alarm state/timer table memory holds more than one set of an alarm state and a timer value associated with one connection in one storage location, and the update unit 12 updates timer values held in one storage location in a single access operation.

The storage unit 14 has an alarm state table memory which holds alarm states each for one of the connections in one storage location, and the readout unit 13 reads the alarm states from the alarm state table memory.

The storage unit 14 has an alarm state OR-representation table memory which, when at least one of alarm states for two or more connections in a group indicates the failed state, stores data indicating that there is a failure associated with one of the connections in that group.

The readout unit 13 first reads data for a group from the alarm state OR-representation table memory and then reads alarm states when the data indicates that there is a failure.

The storage unit 14 has an alarm state change OR-representation table which, when at least one of alarm states for two or more connections in a group changes, stores data indicating that there is a change in the alarm state associated with one of the connections in that group.

The readout unit 13 first reads data for a group from the alarm state change OR-representation table memory and then reads an alarm state when that data indicates that there is a change in the alarm state.

The storage unit 14 has an alarm state latch section which, when the alarm state for a connection changes, latches change information consisting of at least one of the alarm state after the change and the kind of failure and the identifier of that connection in the order of generation, and the readout unit 13 reads the change information latched by the latch section.

Here, the kind of failure means a distinction between AIS and RDI cells, by way of example.

When the information collection device of FIG. 5 measures the characteristics of a connection using a communications cell passing through the switching unit, the storage unit 14 stores first information consisting of two or more data items on the passing cell for each connection set up on the communications network.

The collection device 11 refers to the second information to send the connection identifier for an incoming cell and a request to update one data item in the first information to the update unit 12.

The update unit 12 has an address generation section 15 which responds to the connection identifier and the data update request to generate a storage address in the storage unit 14 in which that data item is stored.

The update unit 12 selects that data needing updating from the first information stored in the storage unit 14 on the basis of the connection identified by the collection unit 11 and the second information and then updates it using the second information.

When there is a need for updating the first information as a result of the reference to the second information, the collection device 11 sends a first information update request to the update unit 12.

The update unit 12 has an adjustment section 16 which, when the first information update request is received, inhibits the readout by the readout unit 13 while an incoming cell passes, and allows the readout after the first information update request has been serviced.

Upon receipt of the first information update request, the update unit 12 updates the first information using the second information extracted by the collection unit 11. Where the update unit updates the first information within the interval of time required for an incoming cell to pass, the readout unit 13 reads the first information from the storage unit 14 after that cell has passed.

Figure 8:
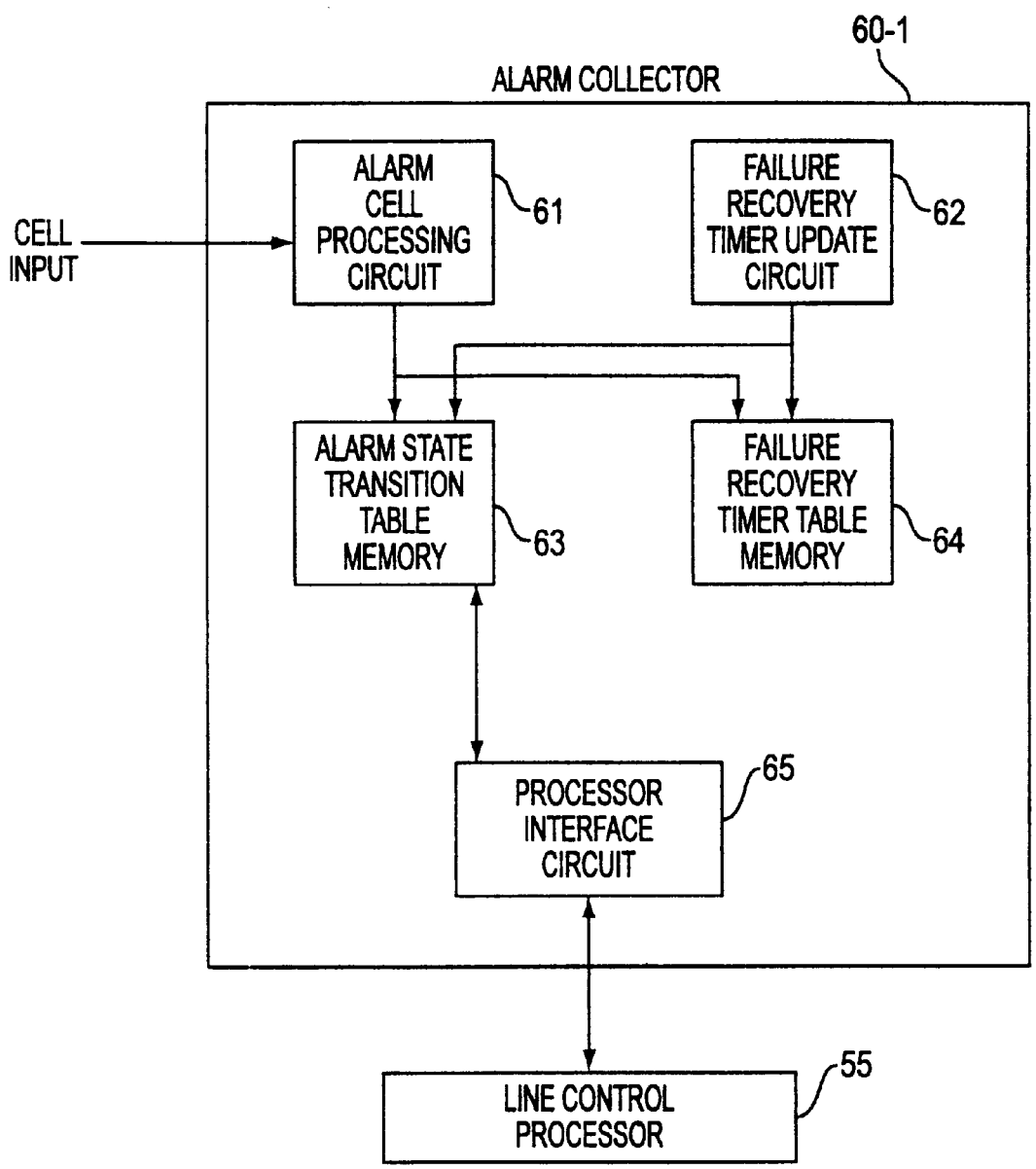
FIG. 8 is a block diagram of the alarm collection device of FIG. 7.
Figure 10:
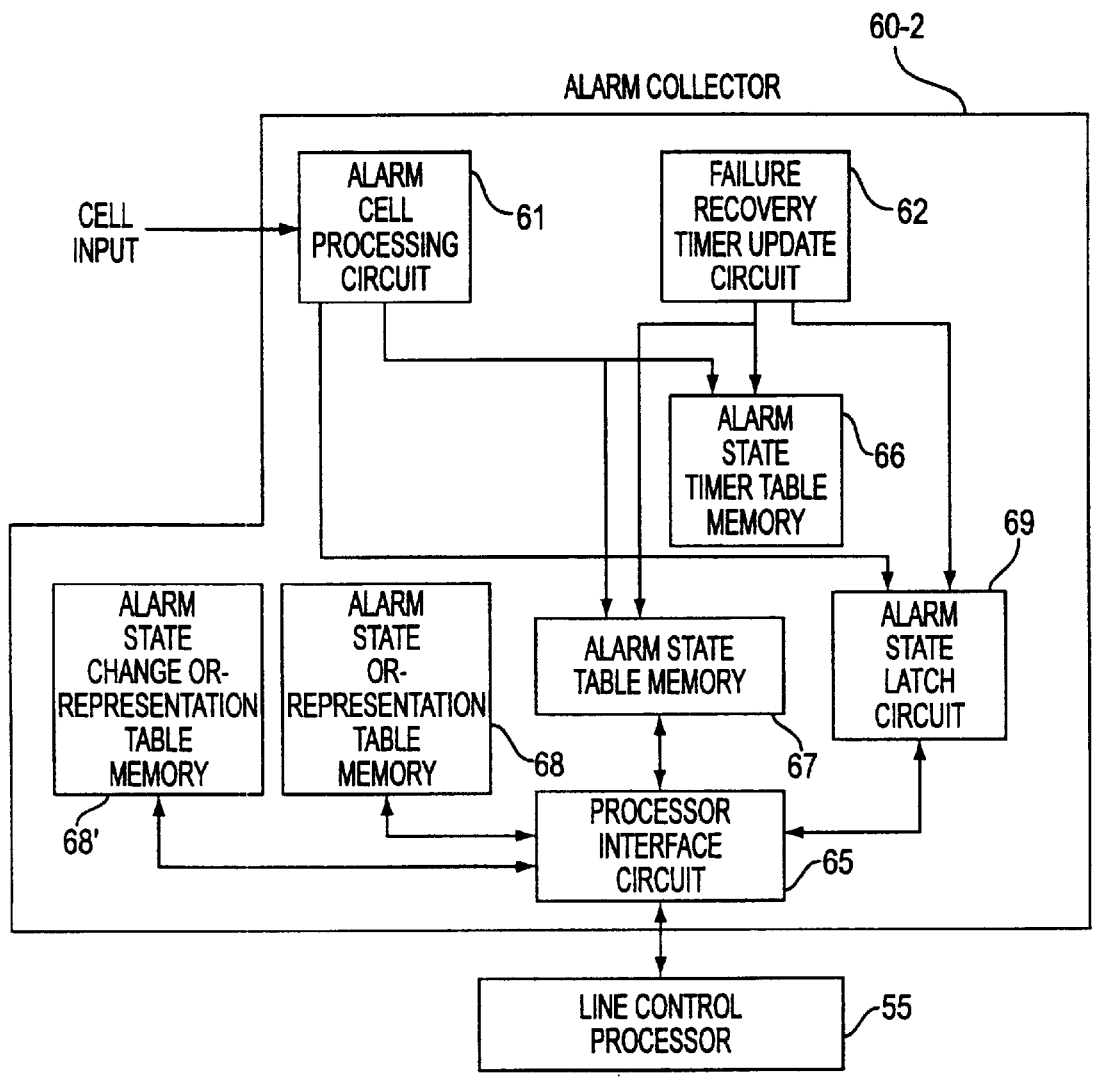
FIG. 10 shows another example of the alarm collection device of FIG. 7.
Figure 20:
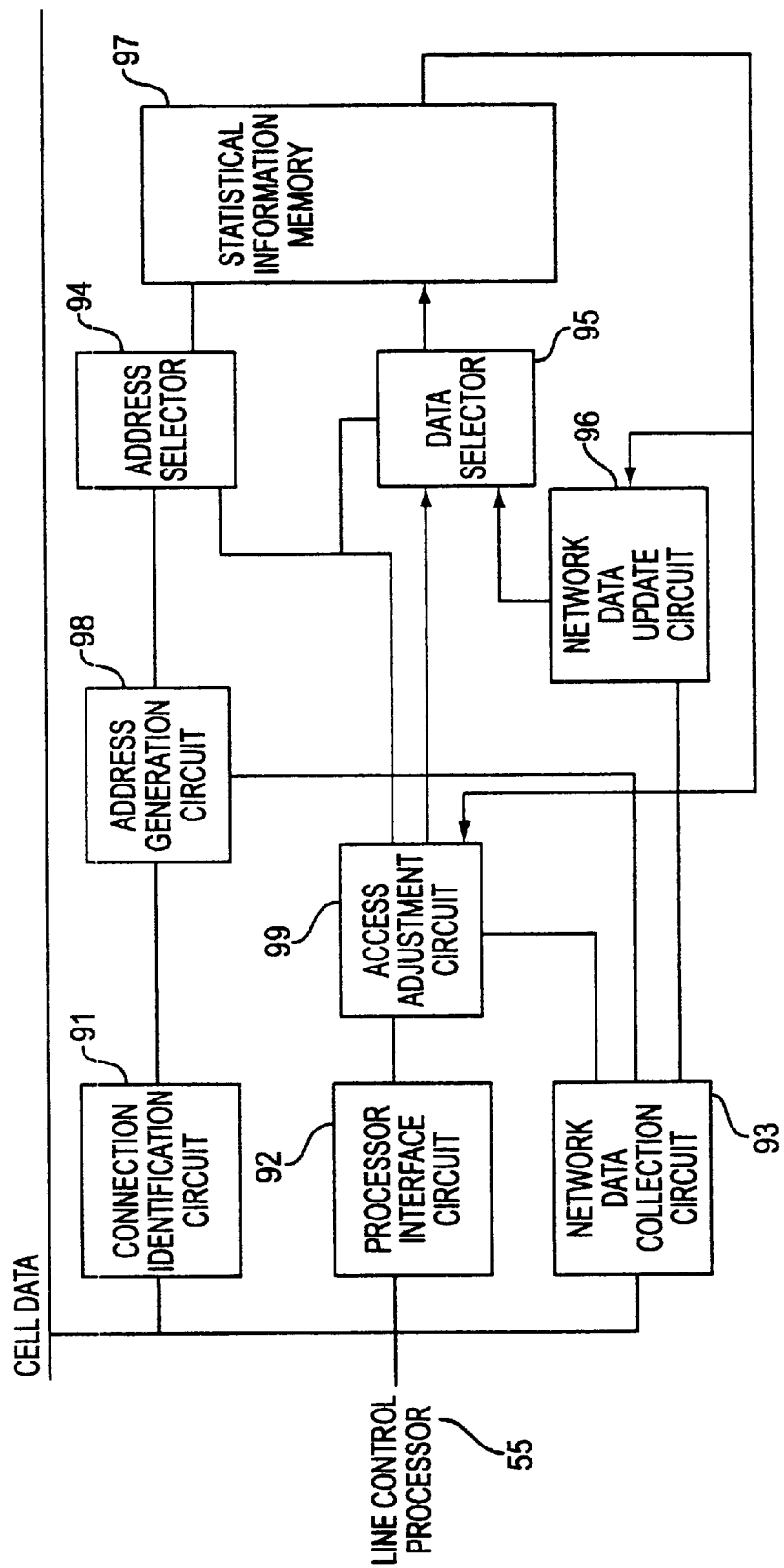
FIG. 20 is a block diagram of a network data collection device in accordance with an embodiment of the present invention.

The storage unit 14 of FIG. 5 includes an alarm state transition table memory 63 and a failure recovery timer table memory 64 of FIG. 8, an alarm state/timer table memory 66, an alarm state table memory 67, an alarm state OR-representation table memory 68, an alarm state change OR-representation table memory 68', and an alarm state latch circuit 69 of FIG. 10, and a statistical information memory 97 of FIG. 20. The alarm state latch circuit 69 corresponds to the alarm state latch section.

An alarm cell processing circuit 61 of FIGS. 8 and 10 corresponds to the collection unit 11 and the update unit 12 of FIG. 5, and a failure recovery timer update circuit 62 corresponds to the update unit 12. A connection identification circuit 91 and a network data collection circuit 93 of FIG. 20 correspond to the collection unit 11, and a network data update circuit 96 corresponds to the update unit 12.

An address generation circuit 98 of FIG. 20 corresponds to the address generating section 15, and an access adjustment circuit 99 corresponds to the adjustment section 16. A processor interface circuit 65 of FIGS. 8 and 10 and a processor interface circuit 92 of FIG. 20 correspond to the readout unit 13.

If, when information about failures in the communications network is collected, an incoming cell is one that gives notification that a failure has occurred, then the update unit 12 writes a failed state in the alarm state associated with the connection to which that cell belongs. When a predetermined value is reached by the timer value for a connection, the update unit 12 returns the alarm state of that connection from the failed state to the normal state.

Thereby, the presence or absence of a failure is managed for each connection set up on the communications network.

An alarm state and a timer value for one connection are stored in one storage location in the alarm state/timer table memory. Thus, there is no need for providing a memory for storing alarm states and a memory for storing timer values separately, thus saving memory.

When two or more sets, each of an alarm state and a timer value, are stored in one storage location, the update unit 12 is allowed to update two or more timer values in a single access operation, which reduces the time taken to update timer values for a large number of connections. Thus, the precision of the timer values is increased.

Two or more alarm states each corresponding to a respective one of the connections are stored in one storage location in the alarm state table memory. Thus, the readout unit 13 is allowed to read two or more alarm states at a time from the table memory.

The data in the alarm state OR-representation table memory can be used to make a decision of whether the alarm states of connections in some groups include failed states. If there are no failed states, it is not required to read the alarm states of the connections in that group. This results in increased efficiency of alarm state readout.

Only when the alarm states change, the alarm state latch means latches changed information, such as the alarm states subjected to changes, in the order in which they are originated. Thereby, the readout unit 13 is allowed to read only the alarm states subjected to changes in the order in which they are originated, which results in increased efficiency of alarm state readout.

When the characteristics of a connection are measured using communications cells, the collection unit 11 sends the connection identifier of an incoming cell and a data update request to the update unit 12. This causes the update unit 12 to recognize the necessity of updating data in the first information.

On the basis of the identifier of a connection and a data update request, the address generation means 15 generates the address of a storage location in the storage unit 14 in which data for that connection is stored.

Thereby, the update unit 12 is allowed to selectively update only data that needs to be updated, with no need to make access to data that need not be updated. Thus, the number of times memory access is made for updating within the time required by one cell to pass can be reduced.

The adjustment section 16 prohibits the readout unit 13 from reading from the storage unit 14 during the interval of a cell (cell slot) that involves data updating. This eliminates the need for providing a time slot for the readout by the readout unit 13 and zero clear in that cell slot.

The readout unit 13 waits until the data update request is serviced and then reads the first information, thus eliminating the need for providing a time slot for data updating in the cell slot at the time of readout of the first information. Therefore, the number of time slots required for one cell slot is further decreased.

In the above manner, information that has been collected can be held and read efficiently.

Figure 6:
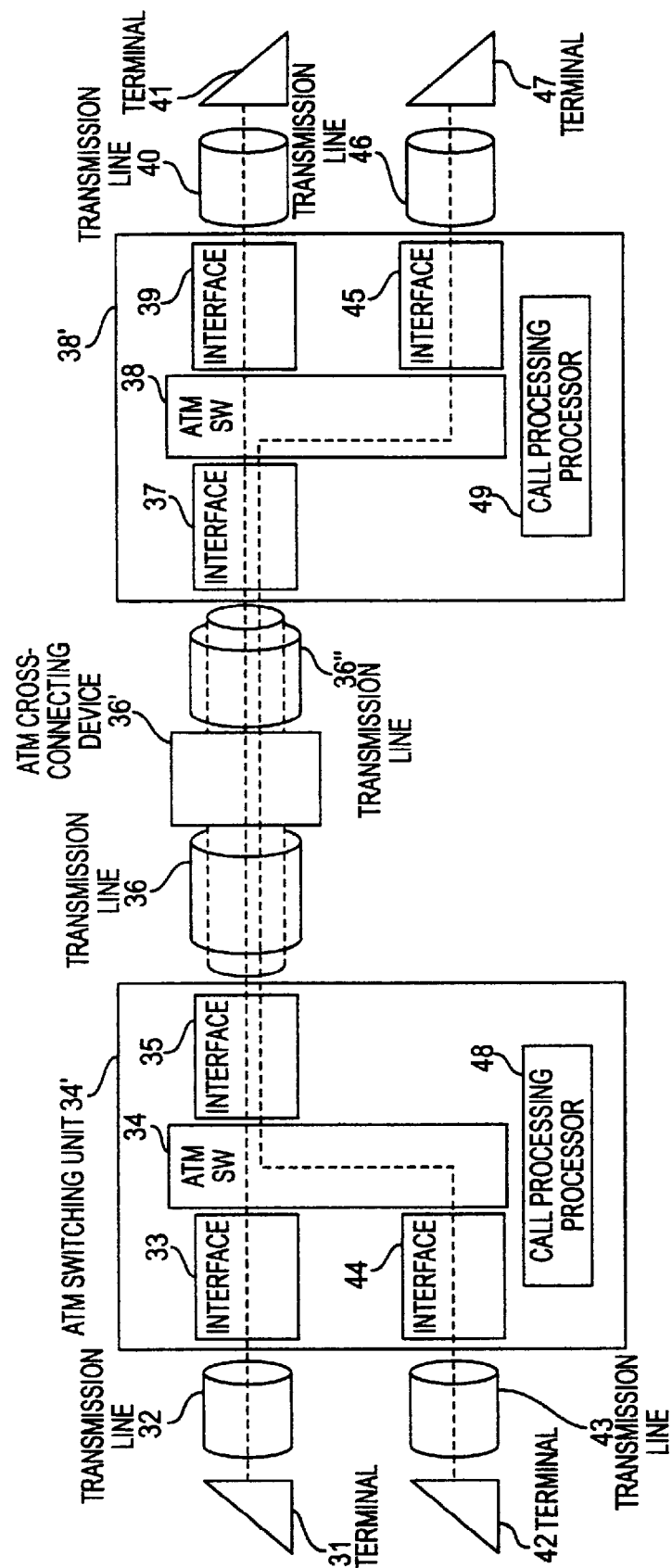
FIG. 6 shows a configuration of a communications network in an embodiment of the present invention.

FIG. 6 shows an example of an ATM communications network using an information collection device embodying the present invention. In this figure, ATM connections are set up between subscriber's terminals 31 and 41 and between subscriber's terminals 42 and 47.

For example, cells that are originated in the terminal 31 are sent to the terminal 41 via a subscriber's transmission line 32, an interface 33, an ATMSW 34, an interface 35, an ATM network transmission line 36, an ATM cross-connection device 36', an ATM network transmission line 36", an interface 37, an ATMSW 38, an interface 39 and a subscriber's transmission line 40.

Also, cells that are originated in the terminal 42 are sent to the terminal 47 via a subscriber's transmission line 43, an interface 44, the ATMSW 34, the interface 35, the ATM network transmission line 36, the ATM cross-connection device 36', the ATM network transmission line 36", the interface 37, the ATMSW 38, an interface 45, and a subscriber's transmission line 46.

The interfaces 33, 39, 44 and 45 are each a subscriber's interface installed in a subscriber's circuit such as a trunk, while the interfaces 35 and 37 are each an interface which relays communications within the ATM network. Call processing processors 48 and 49 are processors for call processing which are installed in ATM switching units 34' and 38', respectively. The information collection device of the present invention is installed in each of the interfaces 33, 35, 37, 39, 44 and 45, by way of example.

In the event that, in the cell transmission path from the terminal 31 to the terminal 41, a failure occurs in the transmission line 36 in the direction of the terminal 41 due to a break in a cable used for communications, the ATM cross-connection device 36' detects this VP failure and transmits a VP-AIS cell in the direction of the terminal 41. The VP-AIS cell is detected by the interface 37, which, in turn, notifies the call processing processor 49 of the VP having failed.

To inform the ATM switching unit 34' of the occurrence of a VP failure in the direction of the terminal 41, the ATM switching unit 38' which detected the VP failure in the transmission line 36 sends a VP-RDI cell in the direction of the terminal 31. This VP-RDI cell is detected by the interface 35, which, in turn, notifies the call processing processor 48 of the transmission line 36 in the direction of the terminal 41 having failed.

Figure 7:
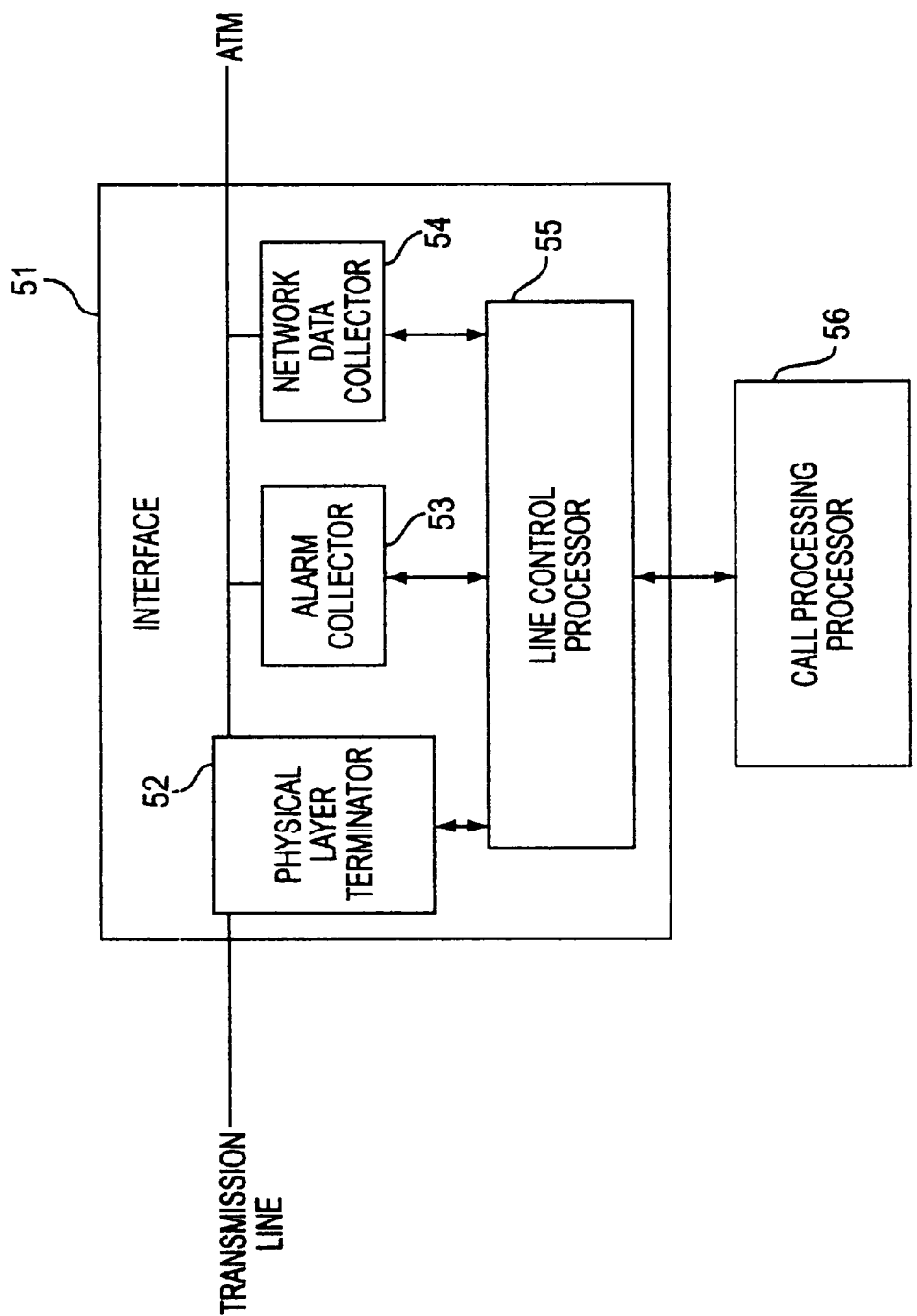
FIG. 7 is a block diagram of the interface of FIG. 6.

FIG. 7 is a block diagram of the interface in which the information collection device embodying the invention is installed. Interface 51 of FIG. 7 corresponds to the interfaces 33, 35, 37, 39, 44 and 45, and processor 56 corresponds to the call processing processors 48 and 49.

In FIG. 7, a physical layer termination device 52 performs protocol control of the physical layer between the transmission line and the ATM switching unit. An alarm collection device 53 and a network data collection device 54 correspond to embodiments of the information collection device of the present invention. A line control processor (farm) 55 transmits commands from the call processing processor 56 to the physical layer termination device 52, the alarm collection device 53, and the network data collection device 54, and transmits necessary information to the call processing processor 56.

Next, reference will be made to FIGS. 8 through 16 to describe the alarm collection device of the present invention.

FIG. 8 shows an exemplary configuration of the alarm collection device 53 of FIG. 7. The alarm collection device 60-1 of FIG. 8 comprises an alarm cell processing circuit 61, a failure recovery timer update circuit 62, an alarm state transition table memory 63, a failure recovery timer table memory 64, and a processor interface circuit 65.

The alarm state transition table memory 63 holds an alarm state transition table into which alarm states have been entered, each of which corresponds to a respective one of ATM connections specified by VPIs or VCIs. The failure recovery timer table memory 64 holds a failure recovery timer table into which timer values have been entered, each of which corresponds to a respective one of the ATM connections in order to measure an alarm cell non-receiving time interval of three seconds, which is one of the conditions for restoring the alarm state from the failed state to the normal state.

Each of the alarm state transition table memory 63 and the failure recovery timer table memory 64 comprises a RAM (Random Access Memory), by way of example.

The alarm cell processing circuit 61 makes a decision of whether an incoming cell is an alarm cell, a cell that becomes a candidate for failure recovery, or another type of cell. According to the type of the incoming cell, the processing circuit 61 writes into the alarm state transition table of the table memory 63. The failure recovery timer update circuit 62 updates data entered into the alarm state transition table 63 and the failure recovery timer table 64.

In ATM communications, the VPI and VCI in the header portion of a cell permit the ATM connection to which that cell belongs to be identified. The VP-connection OAM cell can be identified by the VPI and a predetermined VCI value. The VC-connection OAM cell can be identified by an identifier, called a PTI (Payload Type Identifier), in the cell header portion, the VPI, and the VCI.

In an OAM cell, information representing the type of the OAM cell is contained in the first byte location in the cell user area (payload), thereby distinguishing between AIS and RDI cells.

The processor interface circuit 65 transmits information to or from the line control processor 55 and reads alarm states of ATM connections from the alarm state transition table as requested by the line control processor 55.

Figure 9:
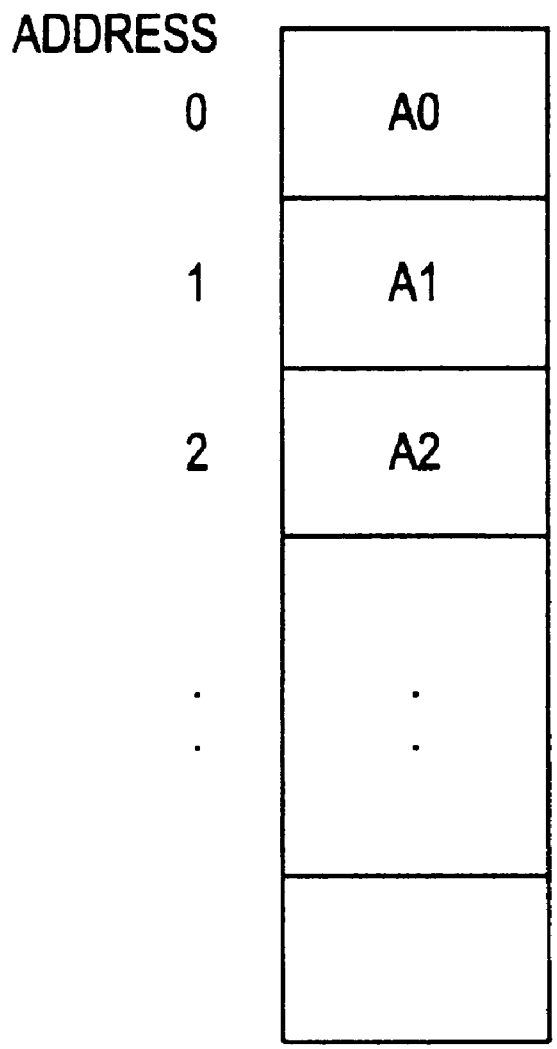
FIG. 9 shows a configuration of the alarm transition table of FIG. 8.

FIG. 9 shows an example of the alarm state transition table held in the alarm state transition table memory 63 of FIG. 8. In this table, alarm states An of specific ATM connections n (n=0, 1, 2, . . . ) are stored in addresses n. For example, An=0 represents the normal state, while An=1 represents the failed state.

When an incoming cell is an alarm cell that gives notification that a failure has occurred in the ATM connection 0, the alarm cell processing circuit 61 writes a 1 in the alarm state stored in the address 0 in the alarm state transition table, and resets the timer value for the ATM connection 0 in the failure recovery timer table to cause a time count operation to start. This is repeated each time an alarm cell for ATM connection 0 arrives. Normally, an alarm cell is received every one second until a recovery is made from the failure that has occurred.

When an alarm state readout request is made by the line control processor 55, the processor interface circuit 65 reads the alarm state transition table and tells the processor 55 that the ATM connection has failed. The failed state of the ATM connection 0 is presented to the call processing processor 56 of FIG. 7 via the line control processor 55.

If the next alarm cell of the ATM connection 0 does not arrive by the time the timer value for the ATM connection 0 reaches three seconds, then the failure recovery timer update circuit 62 changes the alarm state A0 in the alarm state transition table to 0. After that, the line control processor 55 informs the call processing processor 56 of recovery from a failure of the ATM connection 0.

Another arrangement is also permitted. That is, if, by the time the timer value for an ATM connection reaches three seconds, a user cell arrives which belongs to that ATM connection, then the ATM connection is considered to have recovered from a failure, and the alarm state for the ATM connection is returned to the normal state.

Thus, with the arrangement of FIGS. 8 and 9 it is possible to manage alarm states on an ATM connection basis and present them to the call processing processor associated with an ATM switching unit.

In the embodiment of FIG. 8, however, the alarm state transition table memory 63 and the failure recovery timer table memory 64 are provided separately. That is, two memories are needed. In the alarm state transition table of FIG. 9, the alarm state for a single ATM connection is stored in a single address. Thus, it will take a long time to read all the alarm states.

FIG. 10 shows another embodiment of the alarm collection device 53 of FIG. 7. The alarm collection device 60-2 of FIG. 10 comprises an alarm cell processing circuit 61, a failure recovery timer update circuit 62, an alarm state/timer table memory 66, an alarm state table memory 67, an alarm state OR-representation table memory 68, an alarm state change OR-representation table memory 68', an alarm state latch circuit 69, and a processor interface circuit 65.

Of these components, the alarm state table memory 67, the alarm state OR-representation table memory 68, the alarm state change OR-representation table memory 68', and the alarm state latch circuit 69 need not necessarily be provided. It is also possible to provide the alarm state table memory 67 alone, a combination of the alarm state table memory 67 and the alarm state OR-representation table memory 68, a combination of the alarm state table memory 67 and the alarm state change OR-representation table memory 68', or a combination of the alarm state table memory 67 and the alarm state latch circuit 69.

In FIG. 10, the alarm cell processing circuit 61, the failure recovery timer update circuit 62 and the processor interface circuit 65, basically operate identically to the their respective counterparts in FIG. 8. Hereinafter, mainly differences from the embodiment of FIG. 8 will be described.

Figure 11:
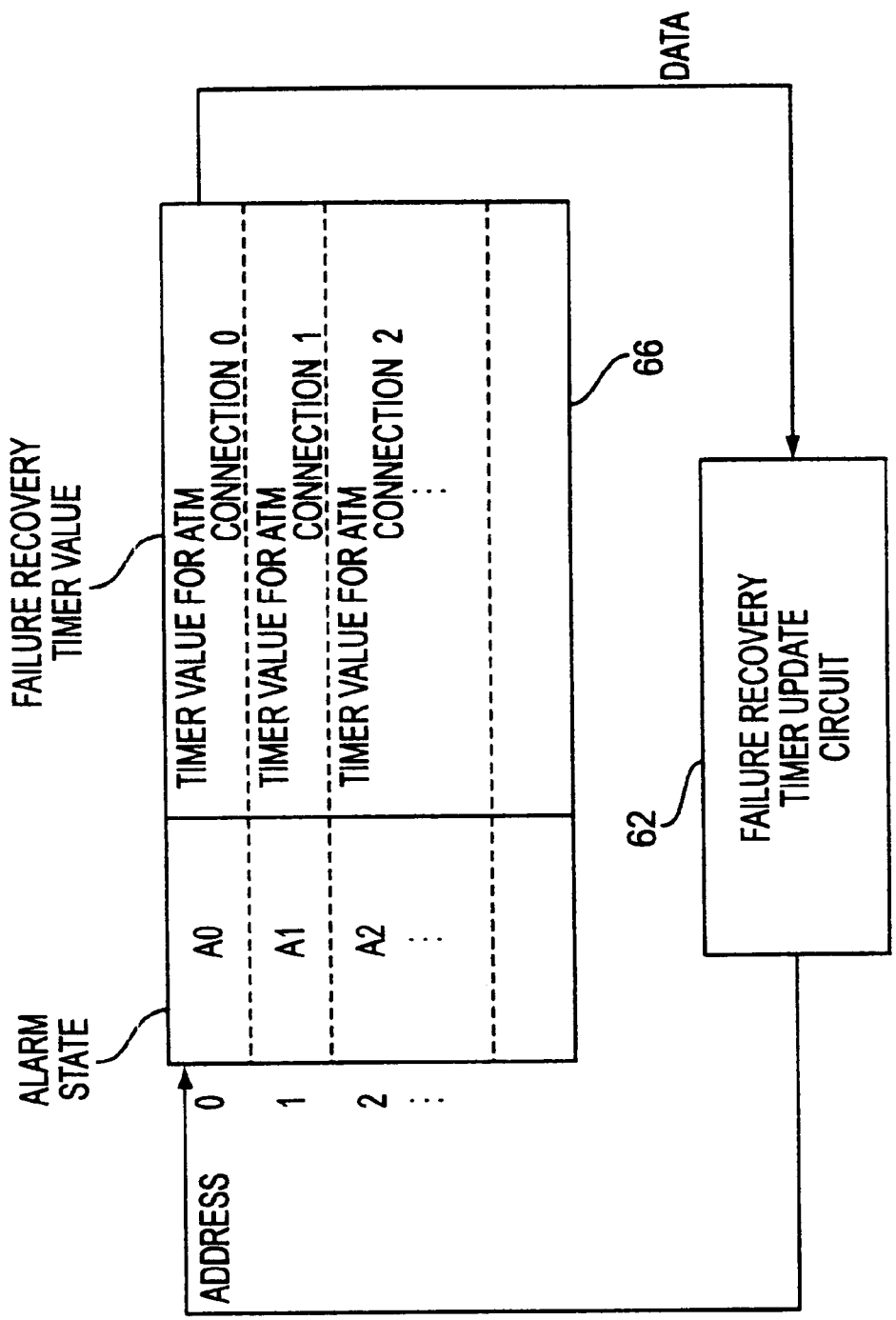
FIG. 11 shows an example of a configuration of the alarm state/timer table of FIG. 10.

FIG. 11 shows an example of an alarm state/timer table held in the alarm state/timer table memory 66. In this table, the alarm state for an ATM connection, which, in FIG. 8, is stored in the alarm state transition table memory 63, and the timer value for the same ATM connection, which, in FIG. 8, is stored in the failure recovery timer table memory 64, are assigned to a single memory address.

To update the alarm state An for an ATM connection n (n=0, 1, 2, . . . ), the alarm cell processing circuit 61 or the failure recovery timer update circuit 62 designates the corresponding address n and then writes a new value for An.

Thus, if the alarm state transition table and the failure recovery timer table are stored in a single memory, the memory storage area can be utilized more effectively and the amount of hardware required can be reduced.

However, if, when information on an ATM connection is allocated to an address, the number of ATM connections increases significantly, then the time it takes to update timer values for all the connections will increase correspondingly. Thus, the possibility exists that errors may be made in time measurements made until failure recovery is made.

Figure 12:
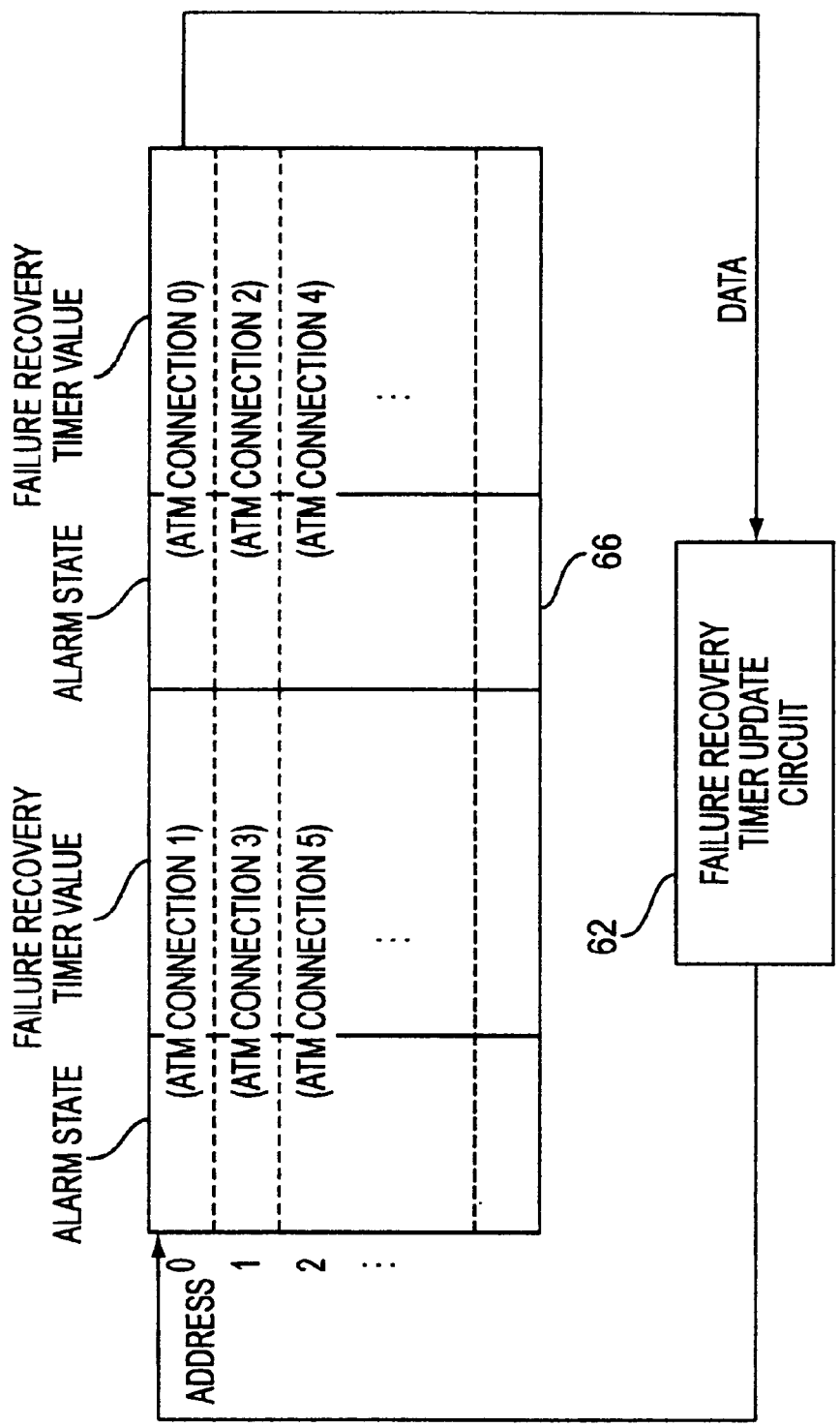
FIG. 12 shows another example of the alarm state/timer table of FIG. 10.

FIG. 12 shows the other embodiment of the alarm state/timer table held in the alarm state/timer table memory 66. In this table, alarm states for two ATM connections, which, in FIG. 8, are stored in the alarm state transition table memory 63, and timer values for the two corresponding ATM connections, which, in FIG. 8, are stored in the failure recovery timer table memory 64, are allocated to a single memory address.

For example, the alarm states and timer values for ATM connections 0 and 1 are stored in address 0, the alarm states and timer values for ATM connections 2 and 3 are stored in address 1, and the alarm states and timer values for ATM connections 4 and 5 are stored in address 2.

With the arrangement of FIG. 12, the timer values for two ATM connections can be updated simultaneously in a single memory access by the failure recovery timer update circuit 62. Thus, the time it takes to update the timer values for all the connections is about half of that in the arrangement of FIG. 11.

Although, in FIG. 12, alarm states and timer values for two ATM connections are stored in a single address, information for more ATM connections can be stored in a single address to further reduce the time taken to update timer values.

In the embodiment of FIGS. 8 and 10, the alarm states for all the ATM connections are read from the alarm state transition table as requested by the line control processor 55; thus, the alarm state transition table memory 63 has to be accessed the number of times equal to the number of connections.

The provision of a separate memory in which alarm states are stored in a bit-mapped form so that alarm states for two or more ATM connections can be read in a single read operation allows the number of times memory access is made to be reduced.

In the embodiment of FIG. 10 the alarm state/timer table memory 66 and the alarm state table memory 67 are provided separately so as to speed up the readout of alarm states by the processor interface circuit 65.

FIG. 13 shows an embodiment of the alarm state table held in the alarm state table memory 67. In this table, alarm states for eight ATM connections are stored in a single address.

For example, alarm states A0, A1, A2, A3, A4, A5, A6, and A7 for ATM connections 0 through 7 are stored in address 0, alarm states A8, A9, A10, A11, A12, A13, A14, and A15 for ATM connections 8 through 15 are stored in address 1, and so on.

When an alarm cell arrives, the alarm cell processing circuit 61 first updates its associated alarm state in the alarm state/timer table and then updates the corresponding alarm state in the alarm state table. When an alarm state readout request is made by the line control processor 55, the processor interface circuit 65 reads a desired alarm state from the alarm state table memory 67 and then presents it to the requesting processor.

In the arrangement of FIG. 13, alarm states for eight ATM connections can be read in a single memory access operation, thus speeding up the readout of alarm states for all the ATM connections. Note that an arbitrary number of alarm states may be stored in a single address without being limited to eight.

At the arrival of an alarm cell and at the time of updating an alarm state by the failure recovery timer update circuit 62, even if the alarm state table is provided, a single alarm state in a single address will make hardware configuration simpler than two or more alarm states in a single address. At the time a readout request is made by the line control processor 55, on the other hand, it is better to be able to read alarm states for more ATM connections in a single memory access operation. For this reason, in addition to the alarm state/timer table, the alarm state table is provided in which two or more alarm states are arranged in a single address.

The addition of the alarm state table memory 67 of FIG. 10 to the embodiment of FIG. 8 will also provide the same advantage.

If, in reading a failed alarm state from the alarm state table and presenting it to the line control processor, it is stored in the last address, it will result in a significant increase in wasted time.

To reduce such waste, three methods may be considered. According to the first two methods alarm states are read in two steps.

In the first method, alarm states of ATM connections are arranged into groups of an arbitrary number of states. Each group first informs of the presence or absence of a failed state, and then ATM-connection alarm states within a group which contains the failed state are read, thereby knowing which ATM connection has failed.

In the second method, changes in alarm states of ATM connections are arranged into groups of an arbitrary number of states. It is known which ATM-connection alarm state has changed by first informing of the presence or absence of a change in the alarm state for each group, and then reading ATM-connection alarm states in a group which contains the alarm state change.

In the other method, only information on ATM connections whose alarm states have changed is stored separately. With this method, information on identifiers of ATM connections which have changed from the normal state to the failed state and types of failures, is held in a latch circuit as change information. The change information of each of the ATM connections in the failed state is read in sequence as needed.

In the embodiment of FIG. 10, the alarm state OR-representation table memory 68 stores the presence or absence of failed states by ATM-connection group. The alarm state change OR-representation table memory 68' stores the presence or absence of changes in alarm state by ATM-connection group. The alarm state latch circuit 69 stores information on ATM connections whose alarm states have changed. The use of the alarm state OR-representation table memory 68, the alarm state change OR-representation table memory 68', or the alarm state latch circuit 69, permits the readout of alarm states to be speeded up.

Figure 14:
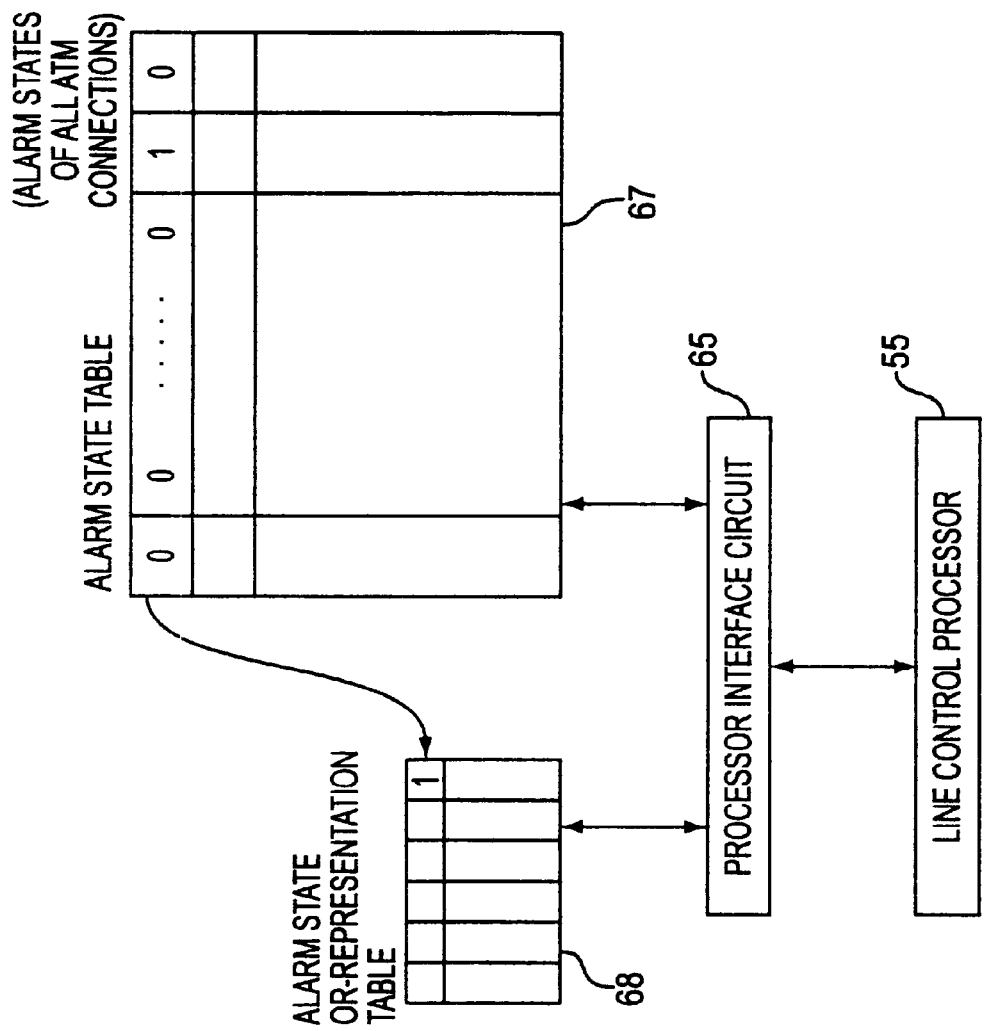
FIG. 14 shows an example of the alarm state OR-indication table of FIG. 10.

FIG. 14 shows an exemplary configuration of the alarm state OR-representation table and its relationship with the alarm state table.

The alarm cell processing circuit 61 divides all the ATM connections into some groups, with ATM connections corresponding to alarm states stored in a single address in the alarm state table being arranged into a group. The values for alarm states in each group are ORed, and the result is stored in the alarm state OR-representation table as a failed state for that group.

For example, if, as shown in FIG. 14, at least one of the alarm state values in one group is one, a one indicating that a failed state exists in that group is written in the corresponding column of the alarm state OR-representation table. When all alarm state values in one group are zeros, it is considered that no failed state exists with the result that a zero is written in the corresponding column of the alarm state OR-representation table.

When the line control processor 55 makes a request for alarm state readout, the processor interface circuit 65 first reads-from the alarm state OR-representation table. Then, the interface circuit reads from the alarm state table only for a group indicating a failed state, and notifies the line control processor of which ATM connection is in the failed state.

Figure 15:
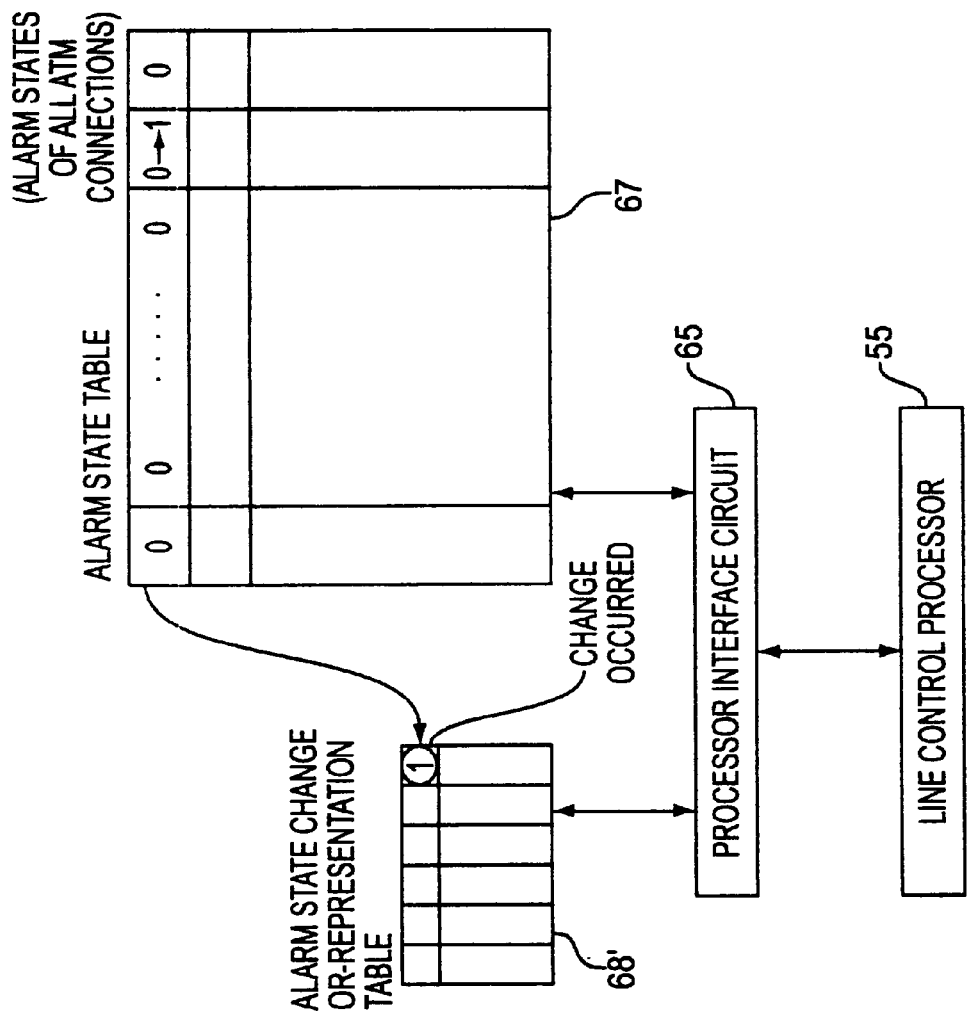
FIG. 15 shows an example of the alarm state change OR-indication table of FIG. 10.

FIG. 15 shows an exemplary configuration of the alarm state change OR-representation table held in the alarm state change OR-representation table memory 68', and its relationship with the alarm state table.

The alarm cell processing circuit 61 divides all of the ATM connections into some groups, with ATM connections corresponding to alarm states stored in a single address in the alarm state table being arranged into one group. The values indicating alarm state changes in each group are ORed, and the result is stored in the alarm state change OR-representation table as a change in the alarm states in that group.

For example, if, as shown in FIG. 15, at least one of the alarm state values in one group changes from zero to one, a one indicating that there is a change in alarm states in that group is written in the corresponding column in the alarm state change OR-representation table as a change in alarm states. When all the alarm state values in one group remain at zero, it is considered that there is no change in alarm states and a zero is written in the corresponding column in the alarm state OR-representation table.

When at least one of the alarm state values in the alarm state table changes from one to zero as well, a one indicating that there is a change in alarm states is written in the alarm state OR-representation table.

When the line control processor 55 makes a request for alarm state readout, the processor interface circuit 65 first reads from the alarm state change OR-representation table. Then, the interface circuit reads from the alarm state table only for a group indicating a change in alarm states, and informs the line control processor for which ATM connection the alarm state has changed and how it has changed.

The provision of the alarm state OR-representation table memory 68 or the alarm state change OR-representation table memory 68' eliminates the need of always reading all of the alarm states in the alarm state table.

Figure 16:
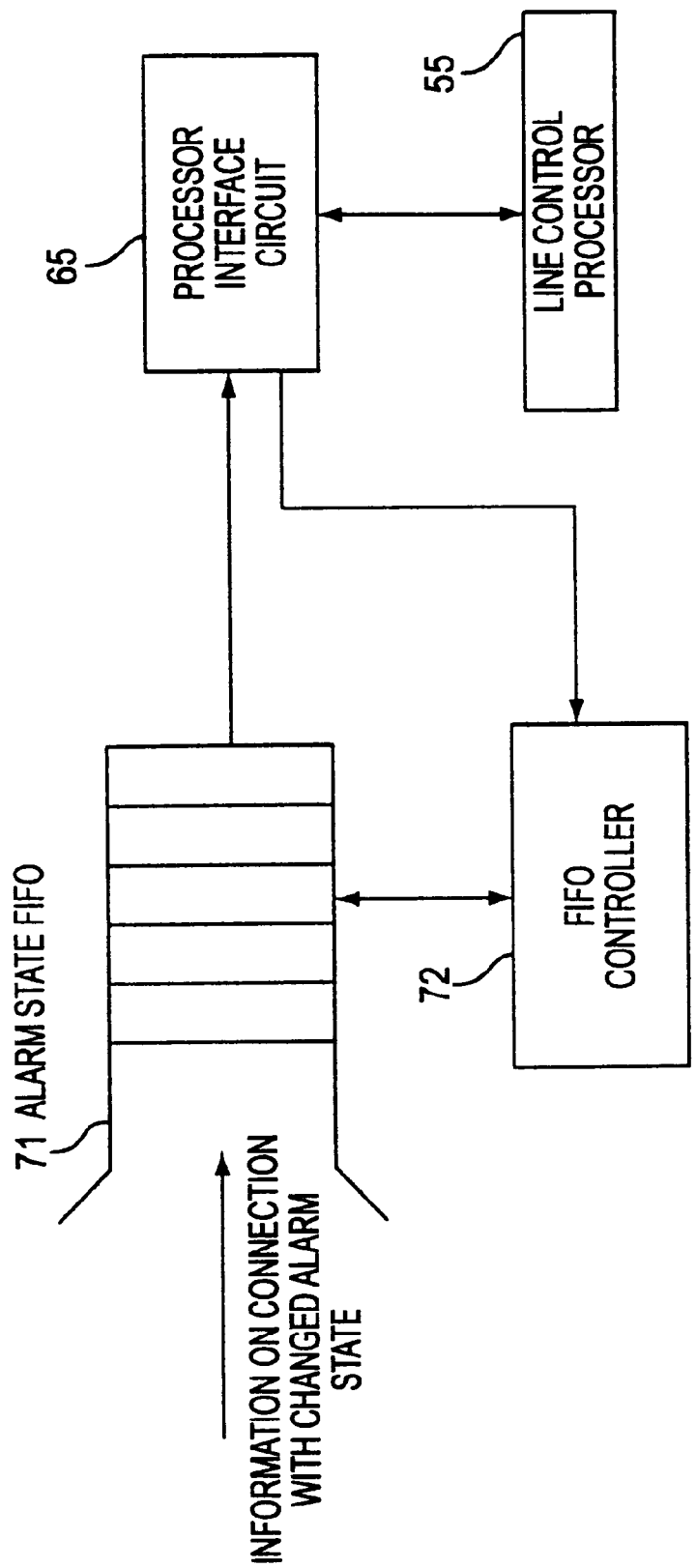
FIG. 16 is a block diagram of the alarm state latch circuit of FIG. 10.

FIG. 16 shows an example of the alarm state latch circuit 69. When alarm cells arrive, the alarm cell processing circuit 61 stores change information such as identifiers of the corresponding ATM connections and types of failures, in an alarm state FIFO 71 in the order of arrival. When each of the timer values in the alarm state/timer table reaches the value specified by the recovery condition, the failure recovery timer update circuit 62 stores change information for each of the corresponding ATM connections in the FIFO 71 in sequence.

Thereby, information on ATM connections whose alarm states have changed is stored in the alarm state FIFO 71 in the order of the occurrence of changes.

As the ATM connection identifiers, VPIs or VCIs of alarm cells are used. Alternatively, identification numbers may be defined as the identifiers. The types of failures comprise information as to whether alarm cells are AIS cells or RDI cells.

When the line control processor 55 makes a request for readout, the processor interface circuit 65 reads and sends information in the FIFO 71 in sequence to the line control processor 55.

A FIFO control circuit 72 controls the operation of writing into the alarm state FIFO 71 by the alarm cell processing circuit 61 and the failure recovery timer update circuit 62, and the operation of reading from the FIFO by the processor interface circuit 65.

Figure 17:
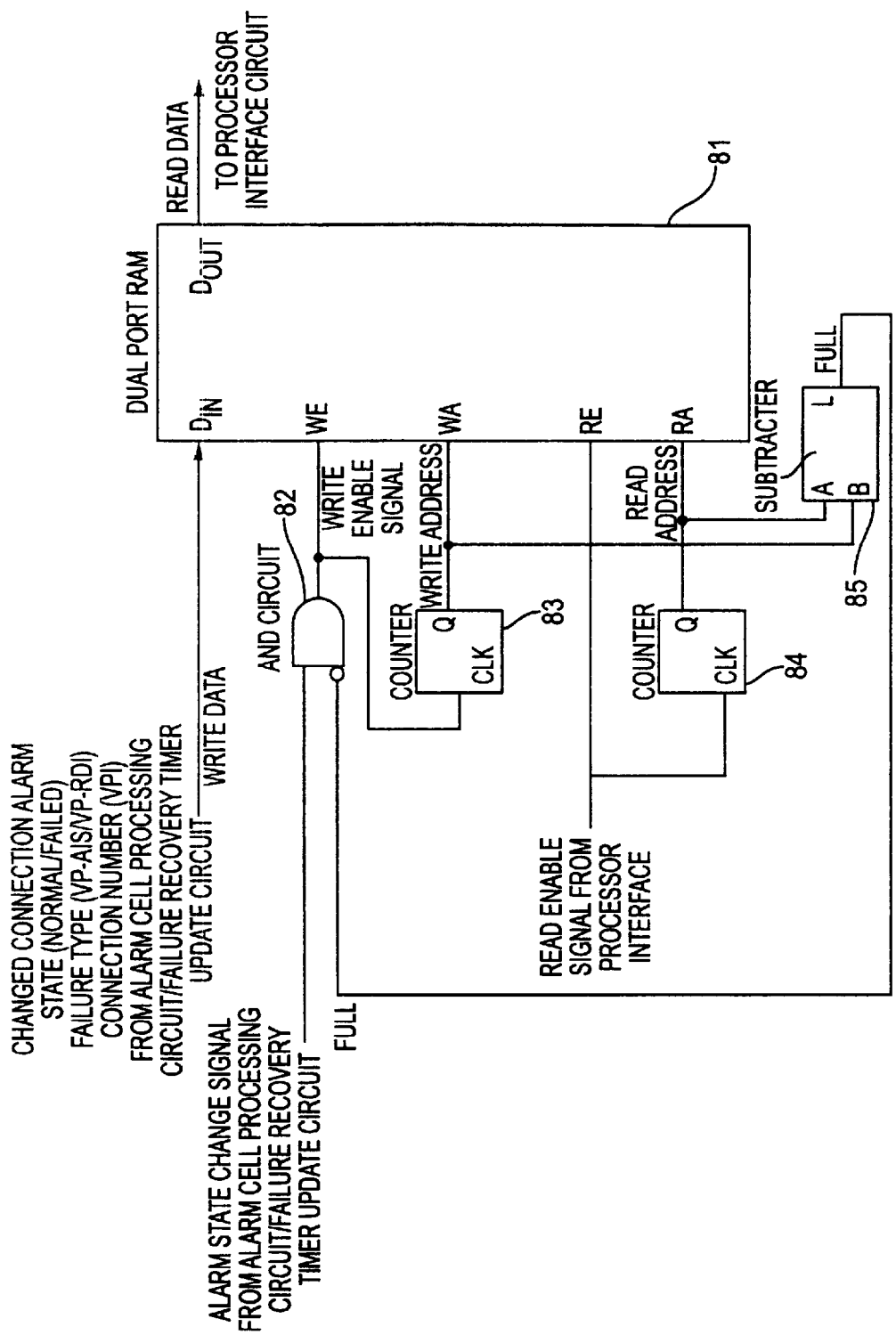
FIG. 17 shows an example of the alarm state latch circuit of FIG. 10.

FIG. 17 shows a specific arrangement of the alarm state FIFO 71 and the FIFO control circuit 72. In this figure, the alarm state FIFO 71 comprises a dual port RAM 81, while the FIFO control circuit 72 comprises an AND circuit 82, counters 83 and 84, and a subtracter 85.

The dual port RAM 81 has a terminal Din into which write data is input, a terminal Dout from which read data is output, a terminal WA for receiving address information designating a location into which write data is loaded, a terminal RA for receiving address information designating a location from which read data is taken, and terminals WE and RE which receive a write enable signal and a read enable signal, respectively.

The counter 83 updates the value at its output Q with each pulse to its terminal CLK, thereby designating write addresses in sequence. Likewise, the counter 84 designates read addresses.

The subtracter 85 subtracts a write address applied to its terminal B from a read address applied to its terminal A to output a logical signal FULL from its terminal L. For example, when the difference between values at terminals A and B reaches a predetermined value, the signal FULL goes to a logic 1, indicating that the storage area of the dual port RAM 81 is full. When the difference between values at terminals A and B is less than the predetermined value, the signal FULL is at a logic 0, indicating that there is free space in the storage area.

The AND circuit 82 has its input connected to receive an alarm state change signal from the alarm cell processing circuit 61 or the failure recovery timer update circuit 62, and its other input connected to receive the inverse of the signal FULL. The alarm cell processing circuit 61 sets the alarm state change signal to a logic 1 when an alarm cell arrives, while the failure recovery timer update circuit 62 sets the alarm state change signal to a logic 1 when ATM connection failure recovery is made.

Thus, when there is some change in alarm states entered into the alarm state/timer table and there is free space in the storage area of the RAM 81, the AND circuit 82 outputs a write enable signal at a logic 1, which is applied to the terminal WE of the RAM 81 and to the terminal CLK of the counter 83 to increment the write address by one.

Thereby, the change information for an ATM connection whose alarm state has changed, which is sent from the alarm cell processing circuit 61 or the failure recovery timer update circuit 62, is written into the RAM 81 as write data. In this case, the write data includes the changed alarm state (failed state or normal state), the alarm type (VP-AIS/VP-RDI/VC-AIS/VC-RDI), and an ATM connection identifier (VPI/VCI).

Upon termination of the writing in of ATM connection information, the alarm cell processing circuit 61 or the failure recovery timer update circuit 62 resets the alarm state change signal to logic 0. Thus, the RAM 81 is written with write data when the alarm state for an ATM connection changes.

On the other hand, it is when the line control processor 55 makes a request for data readout that data is read from the RAM 81. At this point, the read enable signal from the processor interface circuit 65 goes to a logic 1, by way of example. The read enable signal is applied to the terminal RE of the RAM 81 and the terminal CLK of the counter 84 to increment the read address.

Thereby, ATM connection change information read from the RAM 81 is sent via the processor interface circuit 65 to the line control processor 55 in the order in which changes has occurred.

The provision of the alarm state latch circuit of FIG. 17 allows the line control processor 55 to read only information on ATM connections whose alarm states have changed, with no need to read the alarm states of other ATM connections.

Hereinafter, a network data collection device of the present invention will be described with reference to FIGS. 18 through 34.

Figure 18:
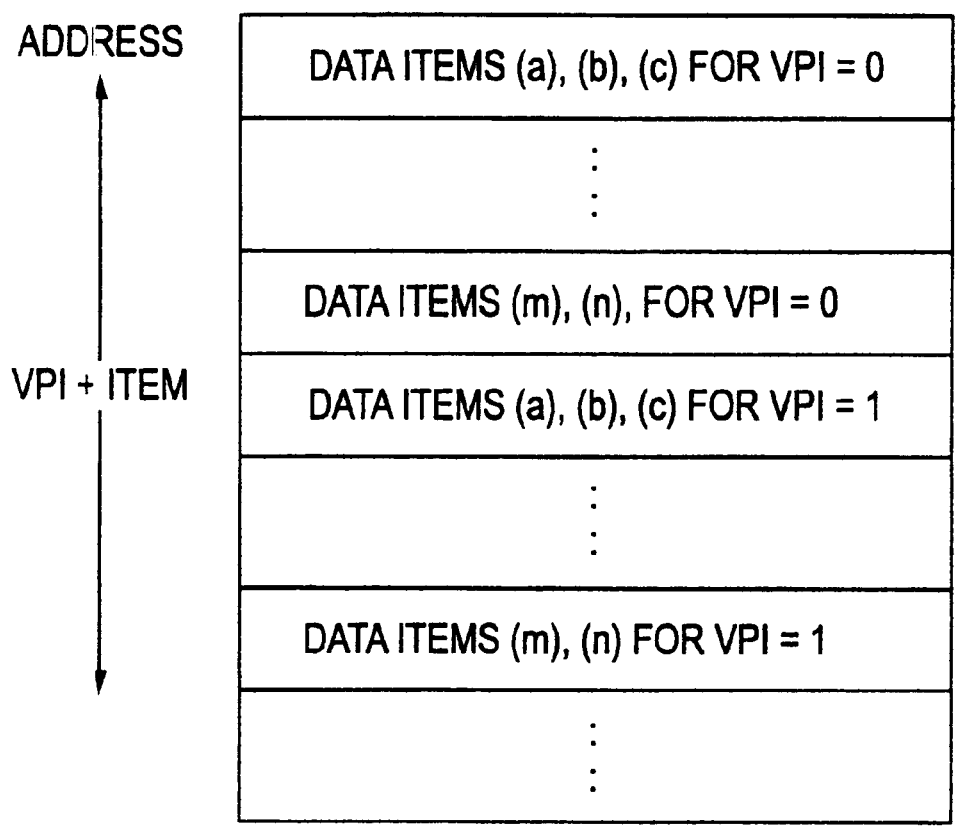
FIG. 18 shows a configuration of the statistical information memory.

In FIG. 18, there are stored data about two or more statistical information items in a single address designated by a VPI and the statistical information items. For example, in the first address there are stored data for three items (a), (b), and (c) related to the VPI=0 ATM connection. Data for the next three items {(d), (e), (f)} subsequent to the item (c) are stored in the next address. However, in the last address for the VPI=0 ATM connection data there are stored data for two items (m) and (n). Data for VPI>1 ATM connections are stored in the same way as with the VPI=0 ATM connection data.

Figure 1:
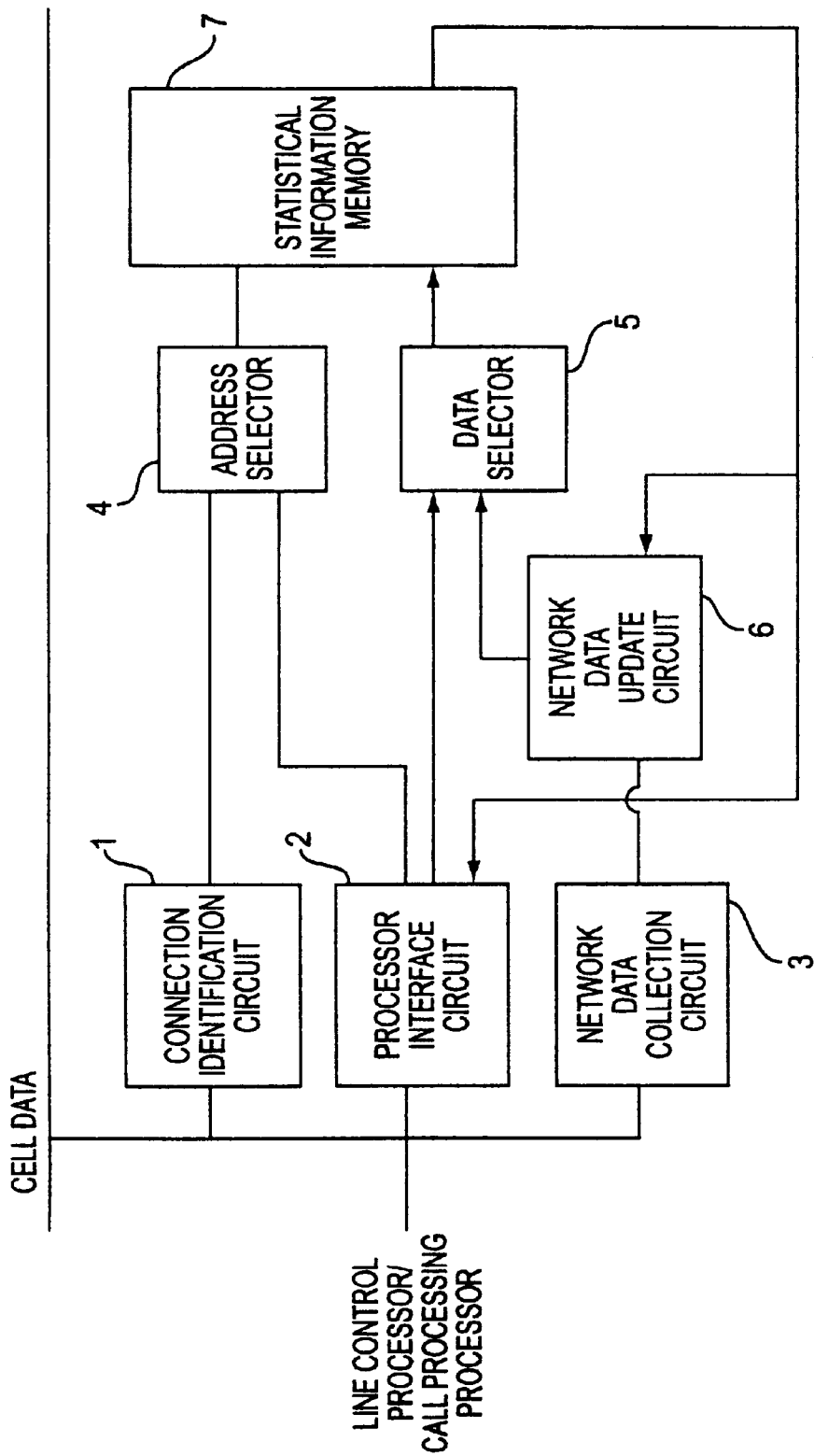
FIG. 1 is a block diagram of a conventional network data collection device.
Figure 2:
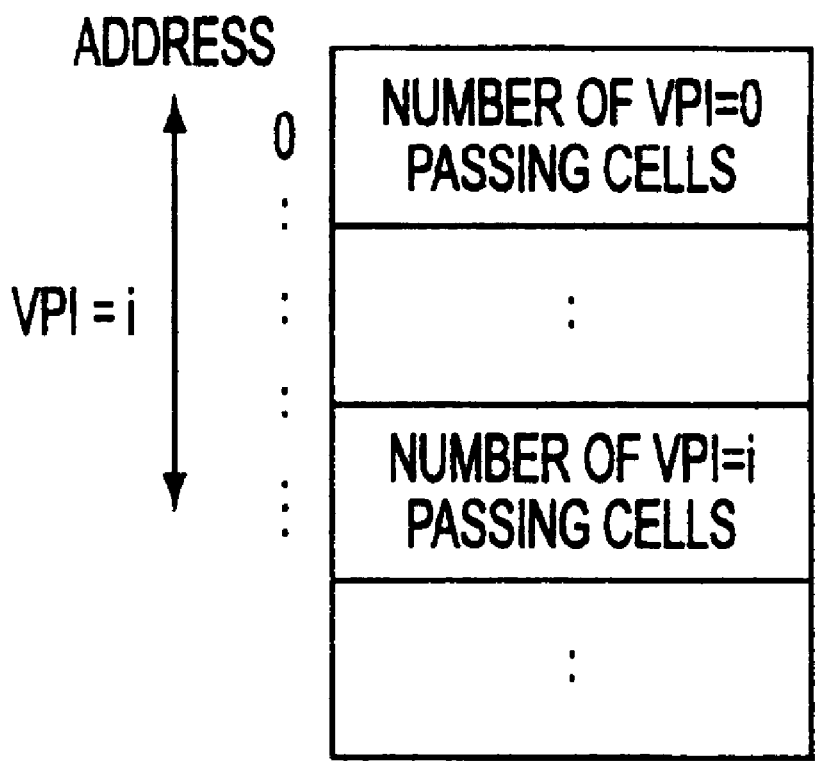
FIG. 2 shows a configuration of the statistical information memory of FIG. 1.
Figure 3:
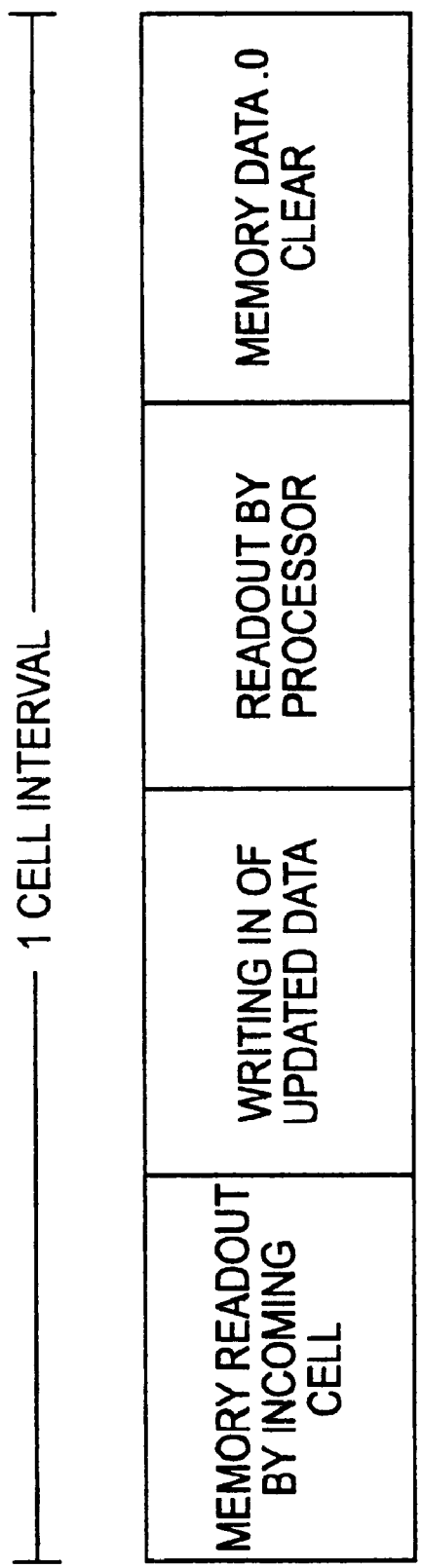
FIG. 3 shows a conventional basic memory access unit.
Figure 4:
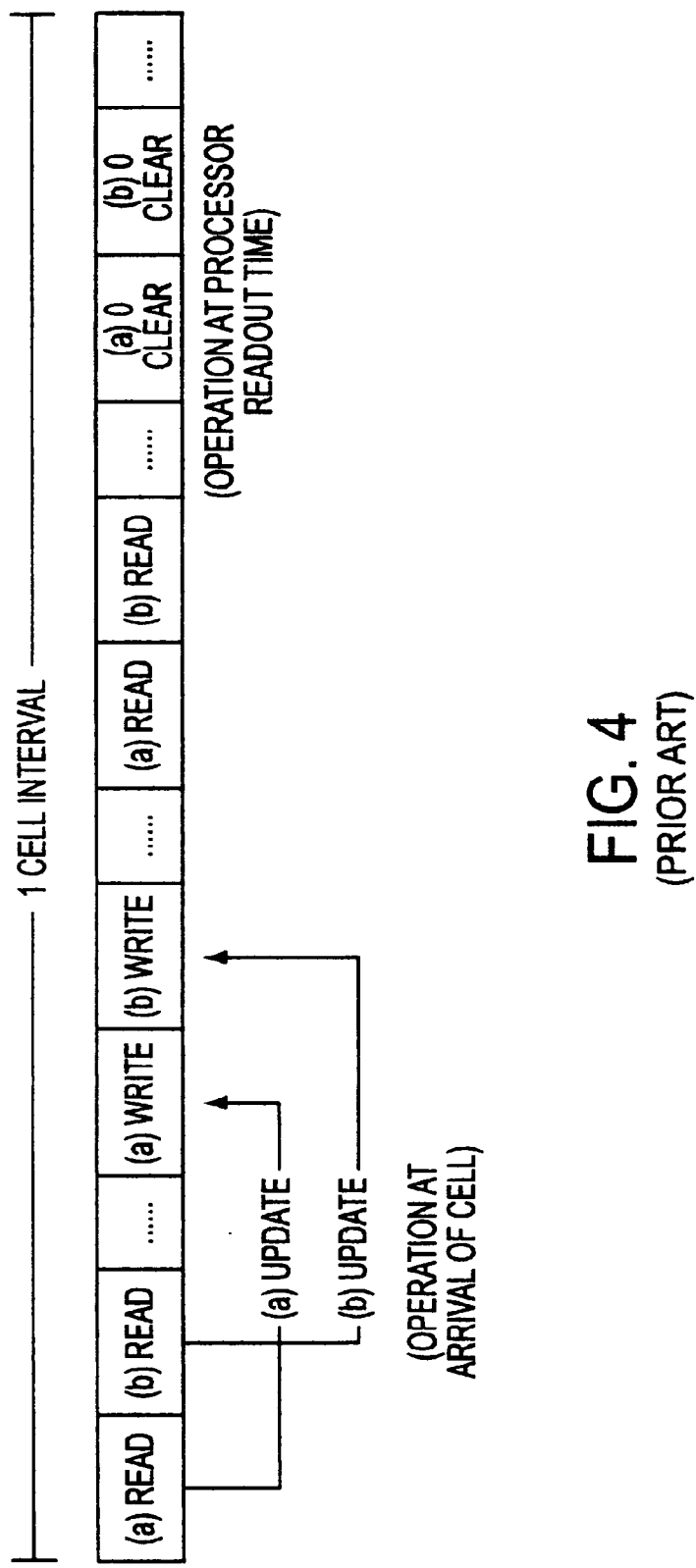
FIG. 4 shows conventional memory accesses in time-division slots.
Figure 19:
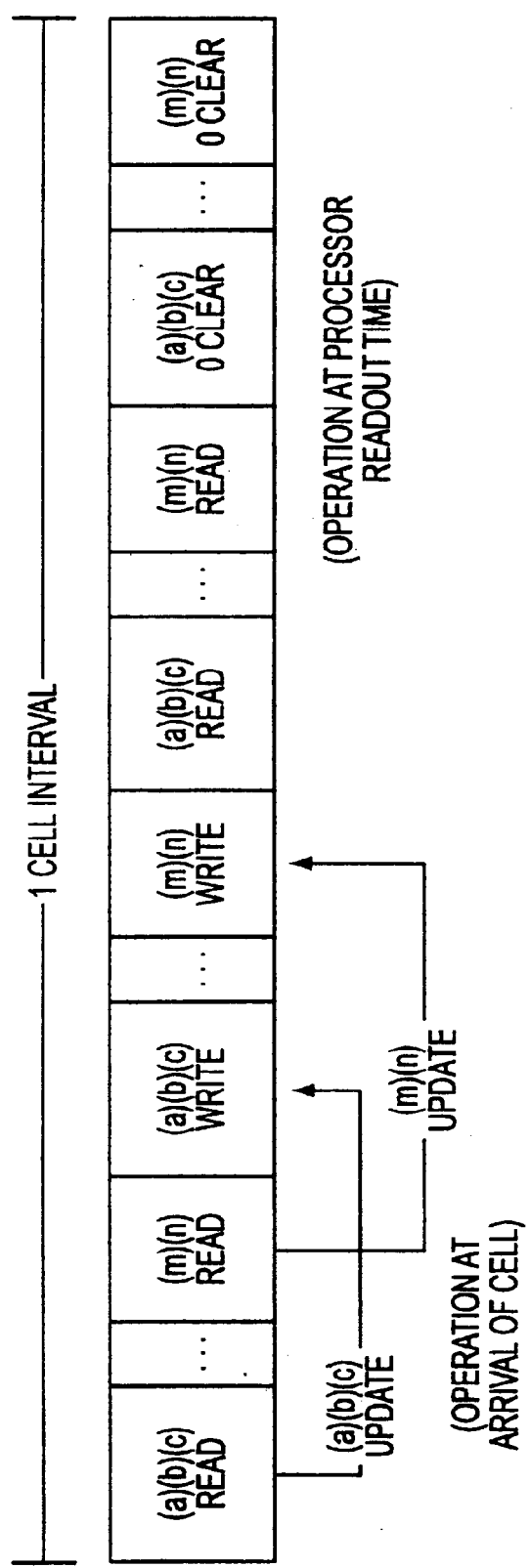
FIG. 19 shows access cycles for the statistical information memory of FIG. 18.

FIG. 19 shows an access cycle for the statistical information memory of FIG. 18. In FIG. 19, three data items can be read or written in a single memory access operation; thus, the number into which one cell interval is divided can be reduced in comparison with the case of FIG. 4, in which the same number of data items are accessed.

If one cell interval is divided into the same number, then the statistical information memory will store more data items. Thus, expansion of the statistical information memory in the data width direction permits much statistical information to be collected within one cell interval.

In the arrangement of FIG. 18, however, since two or more items are placed in the same address, a storage area large enough to accommodate those items is required, increasing the amount of memory needed. In general, in current general memories, the width in the data direction (bit direction) is 8 or 16 bits. Thus, a large number of memory units will have to be used due to the constraints on the number of bits.

FIG. 20 shows another example of the network data collection device 54, which comprises a connection identification circuit 91, a processor interface circuit 92, a network data collection circuit 93, an address selector 94, a data selector 95, a network data update circuit 96, a statistical information memory 97, an address generation circuit 98, and an access adjustment circuit 99.

In FIG. 20, the statistical information memory 97 retains network data. The connection identification circuit 91 reads from an incoming cell identification information of an ATM connection to which that cell belongs and provides it to the address generation circuit 98. ATM connection identification information includes identifiers such as VPIs, VCIs, or the like.

The network data collection circuit 93 collects or computes data used to update the statistical information memory 97 from the incoming cell. The circuit 93 examines statistical information items that need updating and then sends a request to update the items to the address generation circuit 98 and the access adjustment circuit 99.

The address generation circuit 98 is responsive to the output of the connection identification circuit 91 and the update request from the network data collection circuit 93 to retrieve an address of data needing updating in the statistical information memory 97, and provides it to the address selector 94.

The network data update circuit 96 reads a value of network data stored in an address in the statistical information memory 97 which is designated by the address selector 94 at the arrival of the cell. Then, the update circuit adds the output of the network data collection circuit 93 to the read value and stores the result in the statistical information memory 97 via the data selector 95.

The processor interface circuit 92 reads network data in the information memory 97 and sends it to the line control processor 55 as requested by the line control processor. The interface circuit provides data sent from the line control processor to the data selector 95 via the access adjustment circuit 99.

The access adjustment circuit 99 performs such control as to prohibit the line control processor 55 from reading from the information memory in time slots in which network data is updated, and forces the control processor to wait for a time slot in which no data is updated, when a read request is made by the processor interface circuit 92.

The address selector 94 selects an access address in the information memory 97 which is designated by the address generation circuit 98 or the access adjustment circuit 99. The data selector 95 selects data to be written into the information memory which is output from the network data update circuit 96 or the access adjustment circuit 99.

Figure 21:
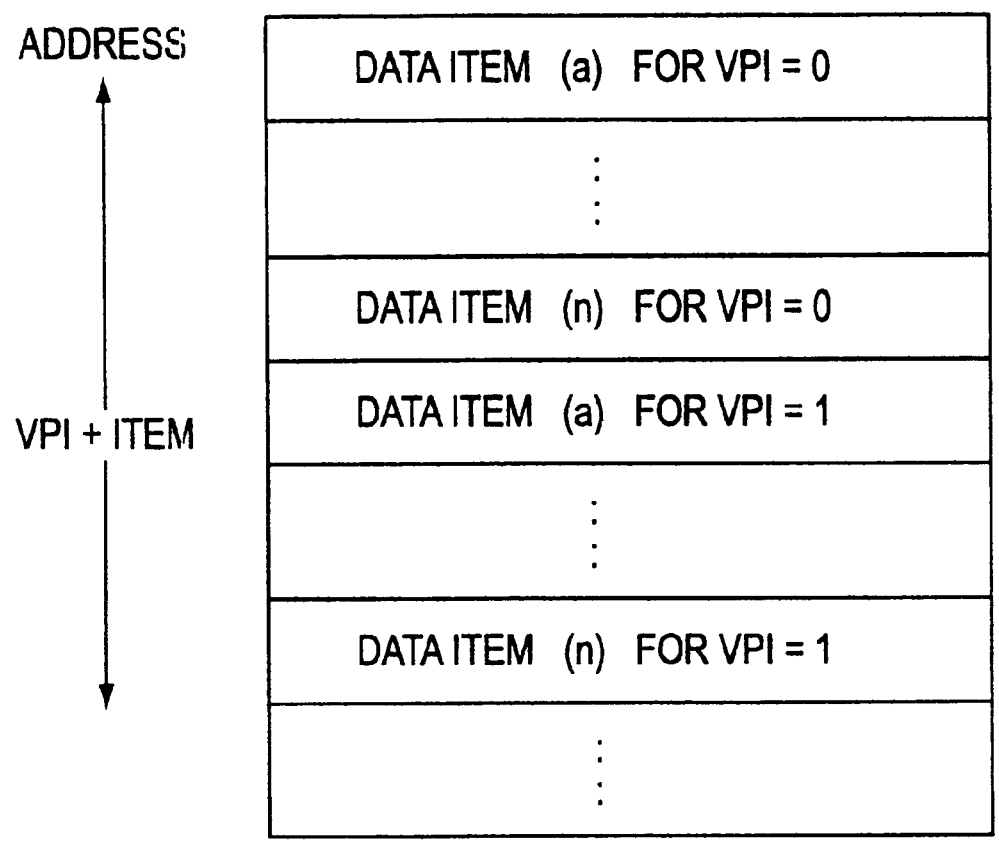
FIG. 21 shows another configuration of the statistical information memory.

FIG. 21 shows an exemplary configuration of the statistical information memory 97 when each of ATM connections is specified by a VPI. In this example, one data item associated with one ATM connection is stored in a single address. Each data storage address is designated by a VPI value and a statistical information item.

For example, data items (a) to (n) related to the VPI=0 ATM connection are stored in sequence by item. Likewise, data items (a) to (n) related to the VPI=1 ATM connection are stored in sequence by item. The same is true of data for ATM connections for which VPI is two or more.

Figure 22A:
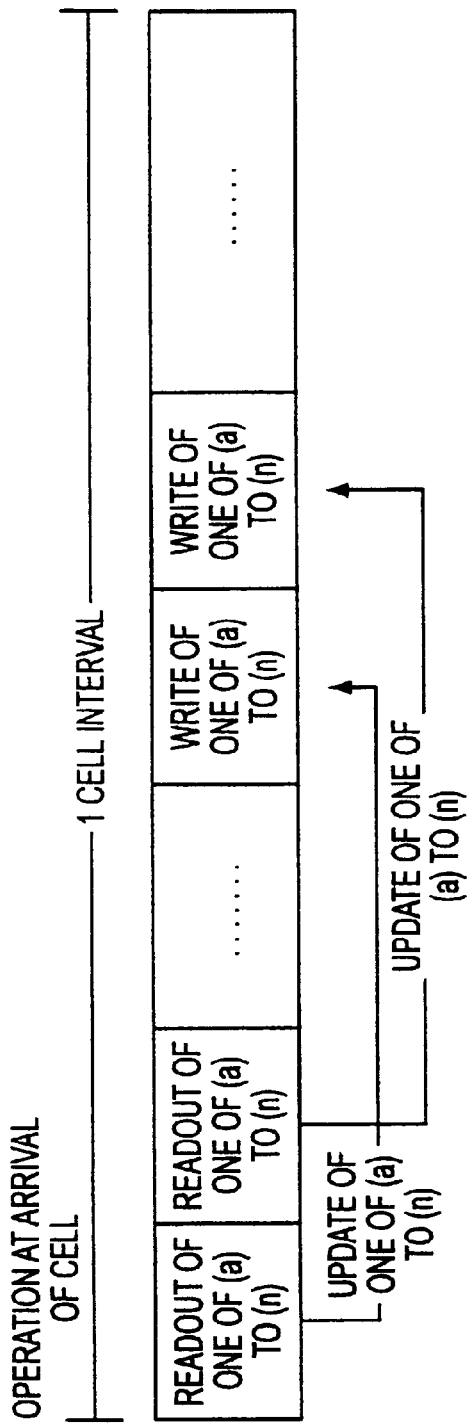
FIGS. 22A and 22B show examples of memory access by the network data collection device of FIG. 20.
Figure 22B:
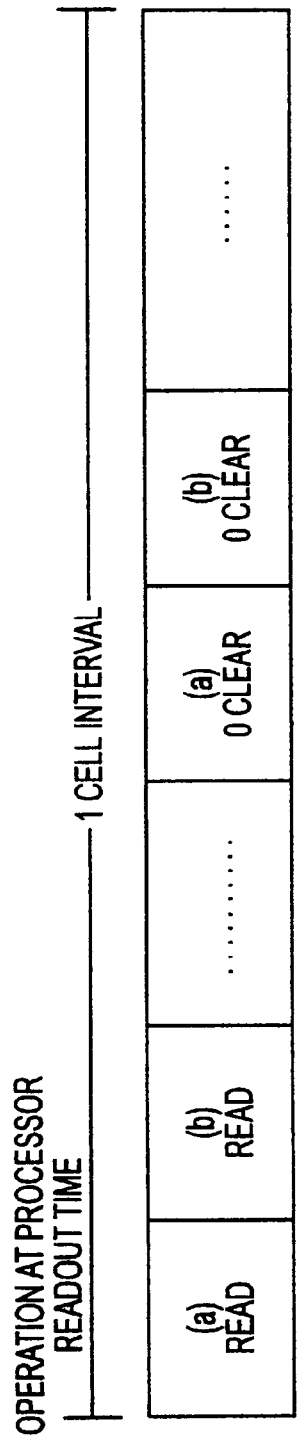

FIGS. 22A and 22B show examples of memory accesses by the network data collection circuit of FIG. 20. At the arrival of a cell, as shown in FIG. 22A, items which, of the items (a) to (n) for the ATM connection to which that cell belong, need updating, are read from the statistical information memory in sequence, and the updated data items are written into the information memory in sequence. At this point, readout by the processor interface circuit 92 is not performed.

Thus, the maximum number of memory accesses within one cell interval at the arrival of a cell is twice the number of items. If the number of items that need updating is limited, then the number of memory accesses to be made will further decrease. Access addresses at this point are generated by the address generation circuit 98.

At the time of readout by the line control processor 55, as shown in FIG. 22B, each of items (a) to (n) for an ATM connection specified in the statistical information memory 97 is read in sequence and then cleared to zero. In this case, therefore, the number of memory accesses within one cell interval is twice the number of items.

Figure 23:
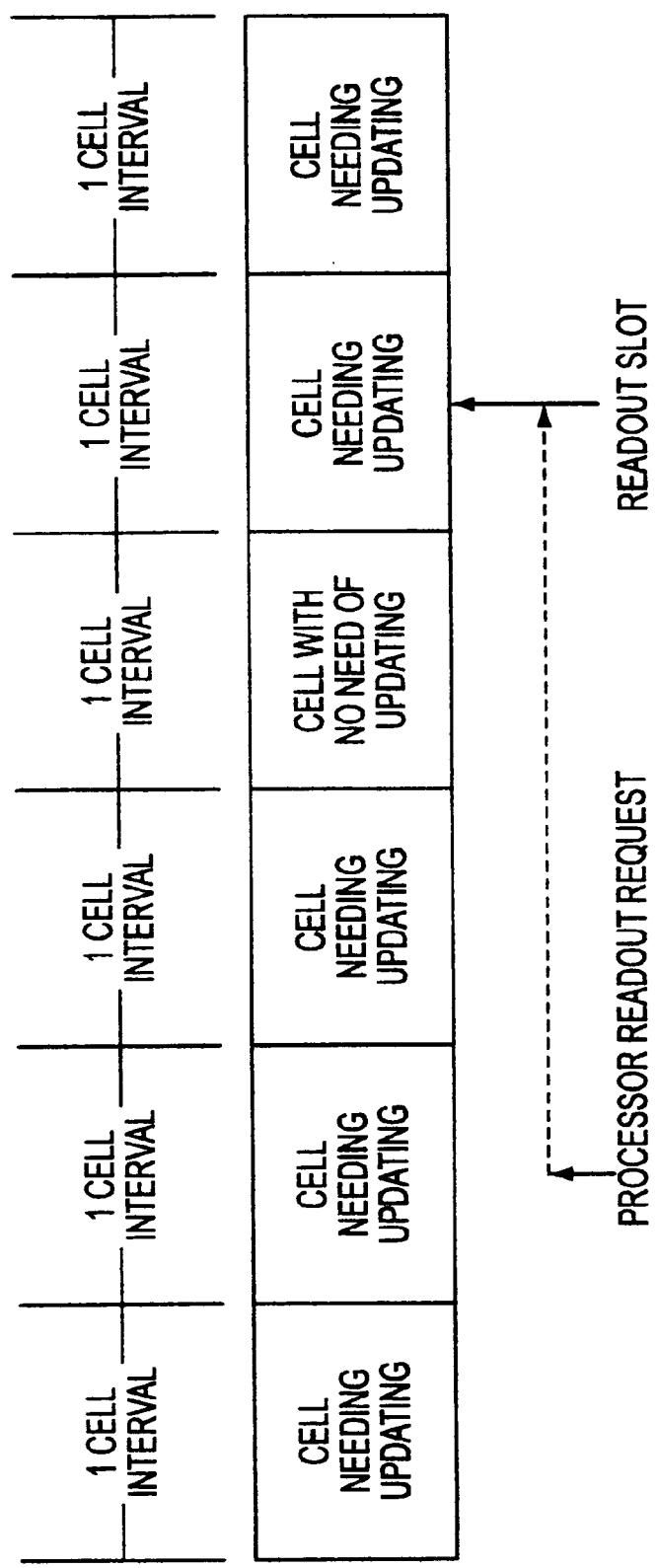
FIG. 23 shows the timing of readout by the processor.

FIG. 23 shows a cell slot in which the readout shown in FIG. 22B is performed. As shown in FIG. 23, readout is not performed in cell slots in which data in the statistical information memory 97 need be updated, even if a readout request is made by the line control processor 55. In the slot for a cell that needs data updating, such memory accesses as shown in FIG. 22B are made.

In the cell slot for a cell in which data in the statistical information memory need not be updated, the line control processor 55 is permitted to read data from the information memory via the processor interface circuit 92. Such readout control is performed by the access adjustment circuit 99.

Figure 24:
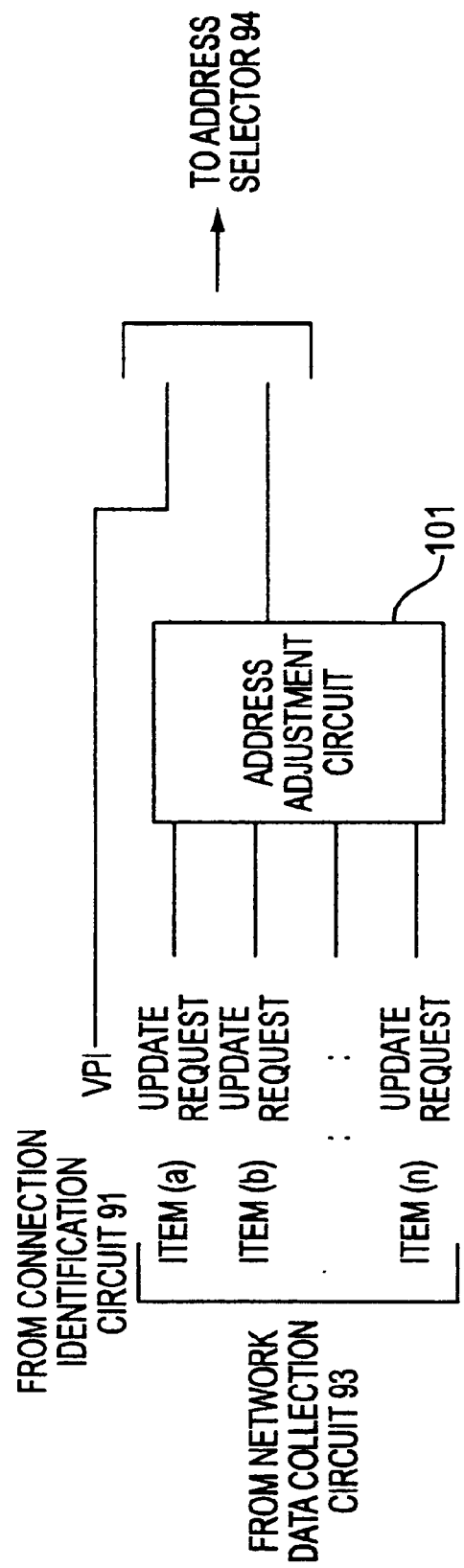
FIG. 24 shows a configuration of the address generation circuit of FIG. 20.

FIG. 24 shows an exemplary arrangement of the address generation circuit 98 of FIG. 20. The address generation circuit comprises an address adjustment circuit 101 which selects an item to be updated from among the statistical information items (a) to (n). The address adjustment circuit 101 generates an access address from each of update requests for items (a) to (n) output from the network data collection circuit 93.

An output of the address adjustment circuit 101 and an ATM connection identifier (e.g., VPI) output from the connection identification circuit 91 are transferred to the address selector 94 as an access address.

The provision of the address generation circuit 98, which generates selectively an address for data that needs updating, permits the number of memory accesses within one cell interval to be decreased.

Figure 25:
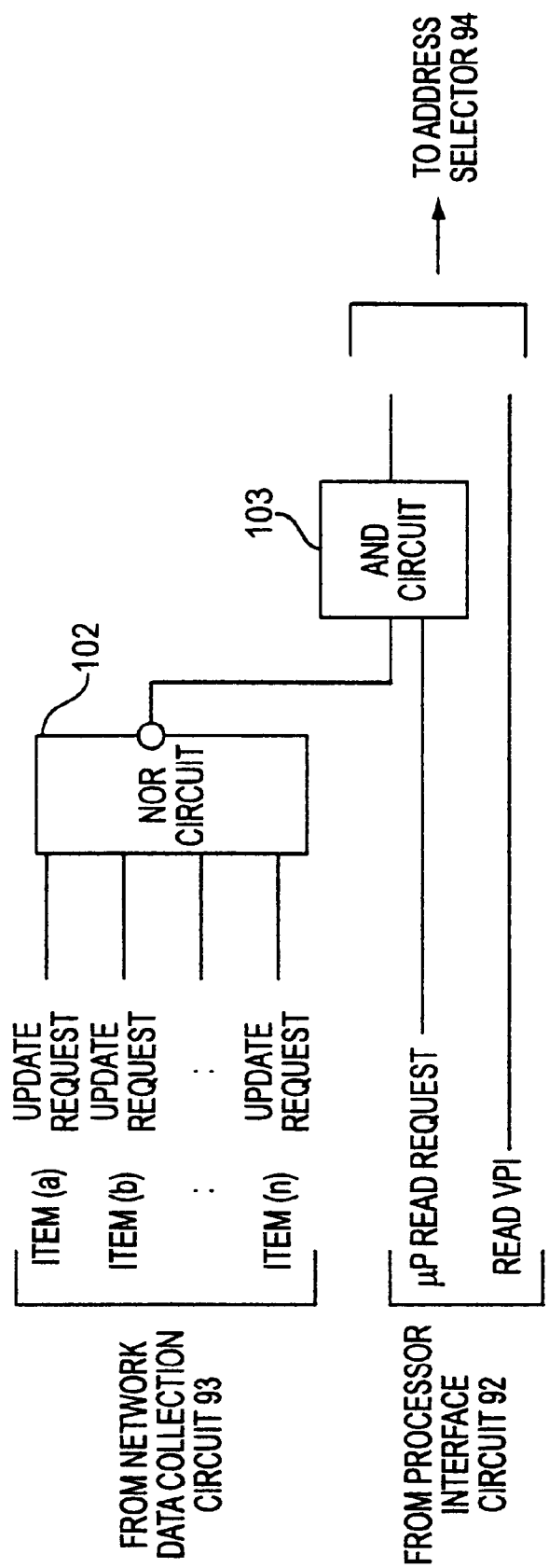
FIG. 25 shows a configuration of the access adjustment circuit of FIG. 20.

FIG. 25 shows an exemplary arrangement of the access adjustment circuit of FIG. 20, which comprises a NOR circuit 102 and an AND circuit 103.

The NOR circuit 102 calculates the logical OR of the update requests for the respective items which are output from the network data collection circuit 93 and provides its negation to the AND circuit 103. The AND circuit 103 outputs the logical product of the output of the NOR circuit 102 and a readout request by the processor output from the processor interface circuit 92 to the address selector 94. The identifier (e.g., VPI) of an ATM connection specified by the processor interface circuit 92 is also sent to the address selector 94.

When at least one of the update requests for the items (a) to (n) is at a logic 1, the output of the NOR circuit 102 will be at a logic 0. In this case, the AND circuit 103 will output a logic 0 even when the readout request by the processor, which is output from the processor interface circuit 92, is at a logic 1. At this point, the address selector 94 generates an access address on the basis of the output of the connection identification circuit 91.

When the update requests for the items (a) to (n) are all at logic 0, the output of the NOR circuit 102 will be at logic 1. If, in this case, the processor readout request is at logic 1, then the AND circuit 103 will output a logic 1. Thus, the address selector 94 generates access addresses for data items (a) to (n) on the basis of the identifier of an ATM connection given by the access adjustment circuit 99.

By masking a readout request by the line control processor 55 using the logical sum of update requests for the respective items (a) to (n), the readout by the line control processor 55 can be delayed until a cell slot in which data is not updated arrives.

Next, an ATM connection quality measurement device which is an embodiment of the network data collection device will be described with reference to FIGS. 26 through 32.

The ATM connection quality measurement device, which has the same arrangement as the network data collection device of FIG. 20, measures the quality of ATM connections using OAM cells called PM (Performance Management) cells which correspond to Recommendation I.610 of the ITU (International Telecommunication Union).

As a example, a description will be made of the measurement of the quality of ATM connections multiplexed on the transmission lines 36 and 36" between the ATM switching units 34' and 38' by ATM connection quality measurement devices built into the interfaces 33 and 39 of FIG. 6.

First, the ATM connection quality measurement device in the interface 33 sends one PM cell over an ATM connection which is a candidate for measurement each time a predetermined number of user cells pass. Each PM cell contains information about MSN (Monitoring Sequence Number), TUC (Total User Cell Number), BIP (Bit Interleaved Parity) 16, CRC (Cyclic Redundancy Check), etc.

The MSN is the sequence number of that PM cell, the TUC represents the number of user cells which has passed prior to that PM cell, the BIP 16 is a BIP 16 code for user cells between the previous PM cell and that PM cell, and the CRC is a CRC code for that PM cell.

Next, the ATM connection quality measurement device in the interface 39 makes a comparison between the information (MSN, TUC, etc.) in a PM cell received and incoming user cells, and updates statistical information about the number of cells discarded on the transmission line 36, the number of bit errors, etc. The call processing processor 49 in the ATM switching unit 38' reads such statistical information from the ATM connection quality measurement device in the interface 39 as needed.

Figure 26:
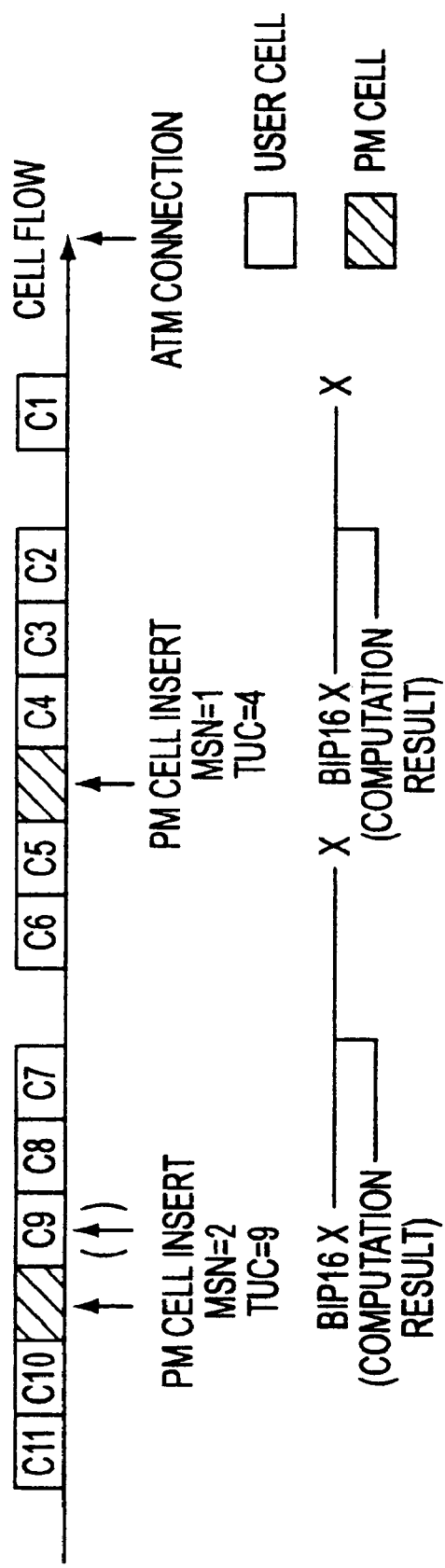
FIG. 26 shows positions into which PM cells are inserted.

FIG. 26 shows the position in which a PM cell is inserted between user cells on an ATM connection.

If each PM cell is inserted every four user cells being transferred, then a PM cell for which MSN=1 will be inserted into an empty slot after four user cells C1, C2, C3, and C4 as shown in FIG. 26. The TUC of that PM cell is four, and the BIP 16 is determined by the results of calculations on the user cells C1 to C4.

Although the next PM cell for which MSN=2 should originally be inserted into the position indicated by ↑ immediately after user cells C5, C6, C7, and C8, the user cell C9 exists in this position and hence the PM cell is actually inserted into the subsequent empty slot indicated by ↑. Therefore, the TUC of the second PM cell will be 9, the sum of the TUC of the first (MSN=1) PM cell, 4, and the number of user cells between the two PM cells, 5. The BIP 16 of the second PM cell depends on the results of calculations on the user cells C5 to C9. The MSN=2 PM cell is followed by user cells C10, C11.

In FIG. 26, a PM cell is inserted every four user cells. However, in practice a PM cell is inserted, for example, every 256, 512 or 1024 user cells for quality measurement.

Here, specific network data items that the ATM connection quality measurement device in the interface 39 collects for each ATM connection include the following items (1) to (8):

(1) The number of cells discarded on a transmission line.

(2) The number of superfluous cells on a transmission line.

(3) The number of erroneous bits in cell data that have occurred on a transmission line.

(4) The number of cells transmitted by the ATM switching unit 34.

(5) The number of blocks in which cells have been discarded.

(6) The number of blocks in which superfluous cells have been produced.

(7) The number of blocks in which bit errors have occurred.

(8) The number of PM cell CRC errors.

The number of superfluous cells in item (2) represents the number of cells that have arrived superfluously due to erroneous insertion. The number of erroneous bits in item (3) represents the difference between the BIP 16 value calculated by the ATM connection quality measurement device itself and the PM cell value. The block (monitoring block) in items (5) to (7) refers to the interval between a PM cell and the previous PM cell which are associated with the same ATM connection.

The statistical information memory 97 in the ATM connection quality measurement device to store such statistical information as described above may be configured as shown in FIG. 27. In a single address there is stored one of the data items (1) to (8) for each VPI-identified ATM connection. Each address is designated by a VPI and an item.

The items (1) and (2) will not be updated simultaneously at the arrival of one PM cell. The bit error in item (3) is defined only when no cells are discarded/erroneously inserted between received PM cells. It will therefore be understood that there is no possibility of simultaneous updating of items (1), (2) and (3). For the same reason, there is no possibility of simultaneous updating of items (5), (6) and (7) either.

Considering that data in items (1) to (7) are valid only when the CRC result of a PM cell is correct (data in item (8) is 0), at least items (4) and (8) will not be updated simultaneously.

Figure 27:
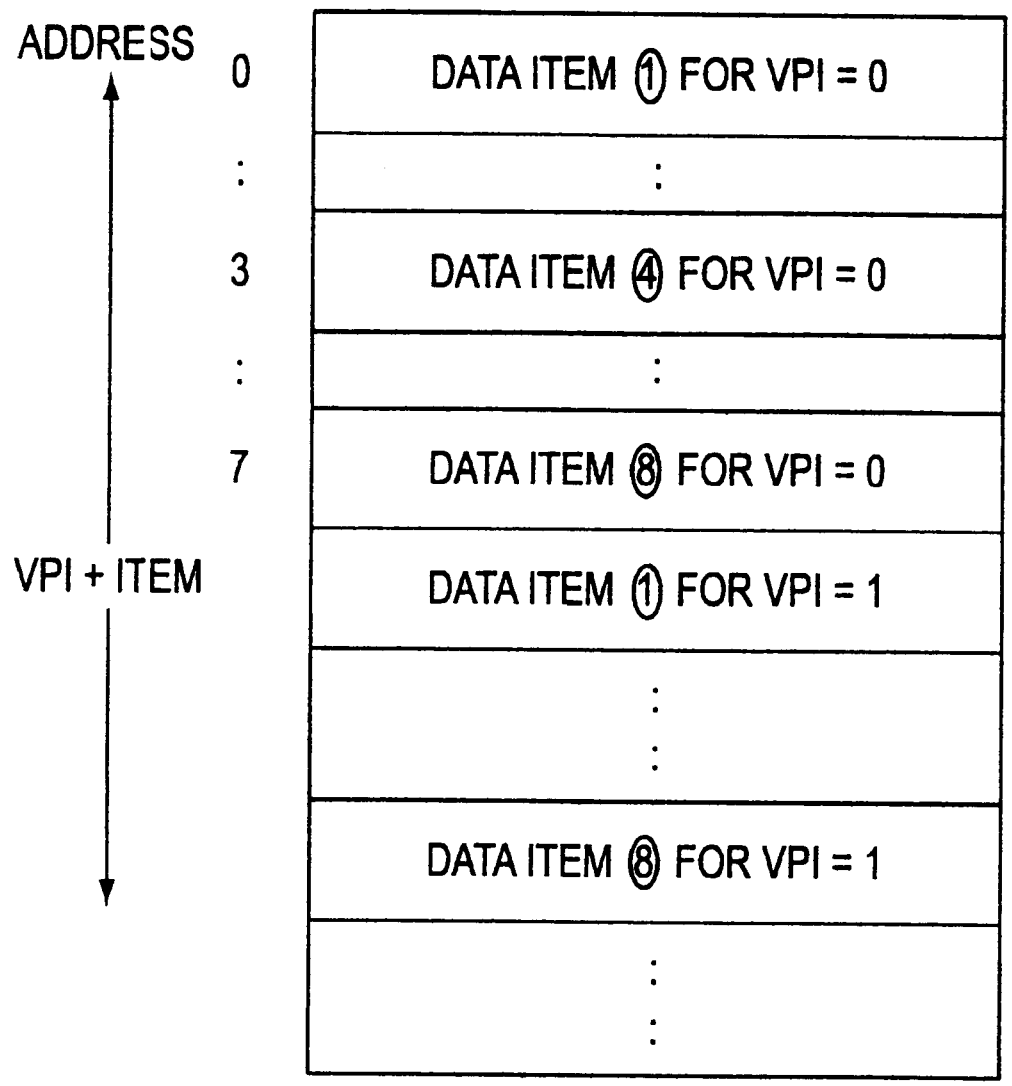
FIG. 27 shows a configuration of a statistical information memory in a connection quality measurement device.
Figure 28A:
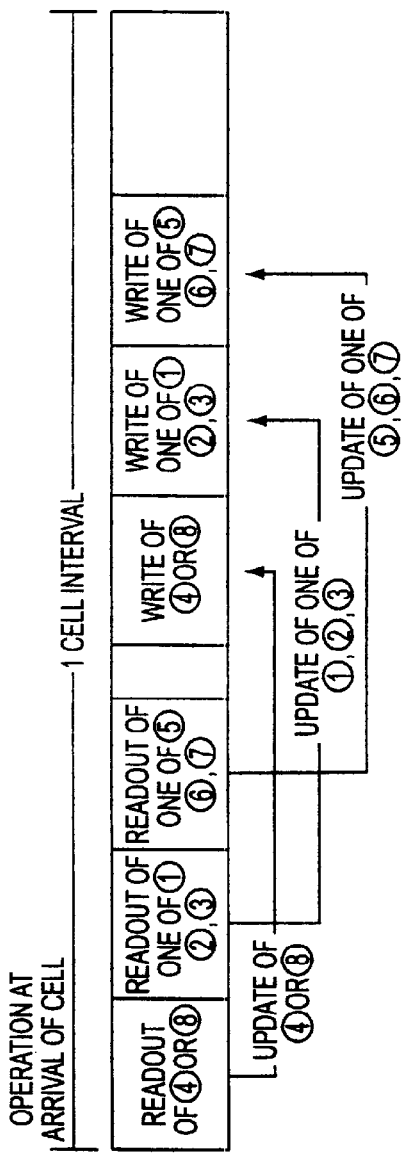
FIGS. 28A and 28B show memory accesses in the connection quality measurement device.
Figure 28B:
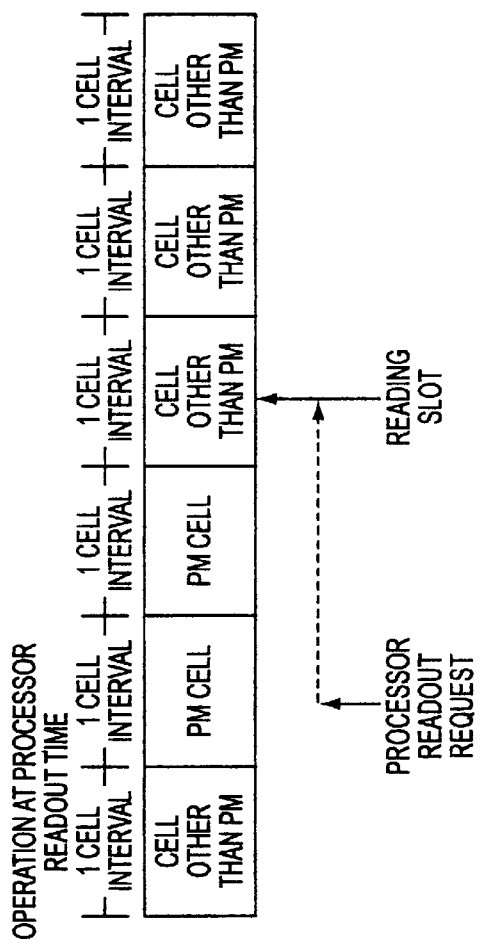

An access cycle for the statistical information memory of FIG. 27 can be set as shown in FIGS. 28A or 28B. At the arrival of a PM cell, memory accesses are made up to six times within one cell interval as shown in FIG. 28A.

Data item (4) or (8) is read from the statistical information memory 97 first. Data item (1), (2) or (3) is read next. Then, data item (5), (6) or (7) is read. And, updated data item (4) or (8), updated data item (1), (2) or (3), and updated data item (5), (6) or (7), are written into the statistical information memory 97, in turn.

When data item (8) in an incoming PM cell is not zero, information of that PM cell is abnormal. Even if data items (1) to (7) are read thereafter, therefore, updating of them is not performed.

When a readout request is made by the line control processor 55, data items will be read, not in the cell slot for a PM cell involving data updating, but in the cell slot for a cell other than a PM cell. Cell slots for cells other than PM cells include user cell slots and empty slots.

In this way, the number of accesses to the statistical information memory 97 can be reduced.

Figure 29:
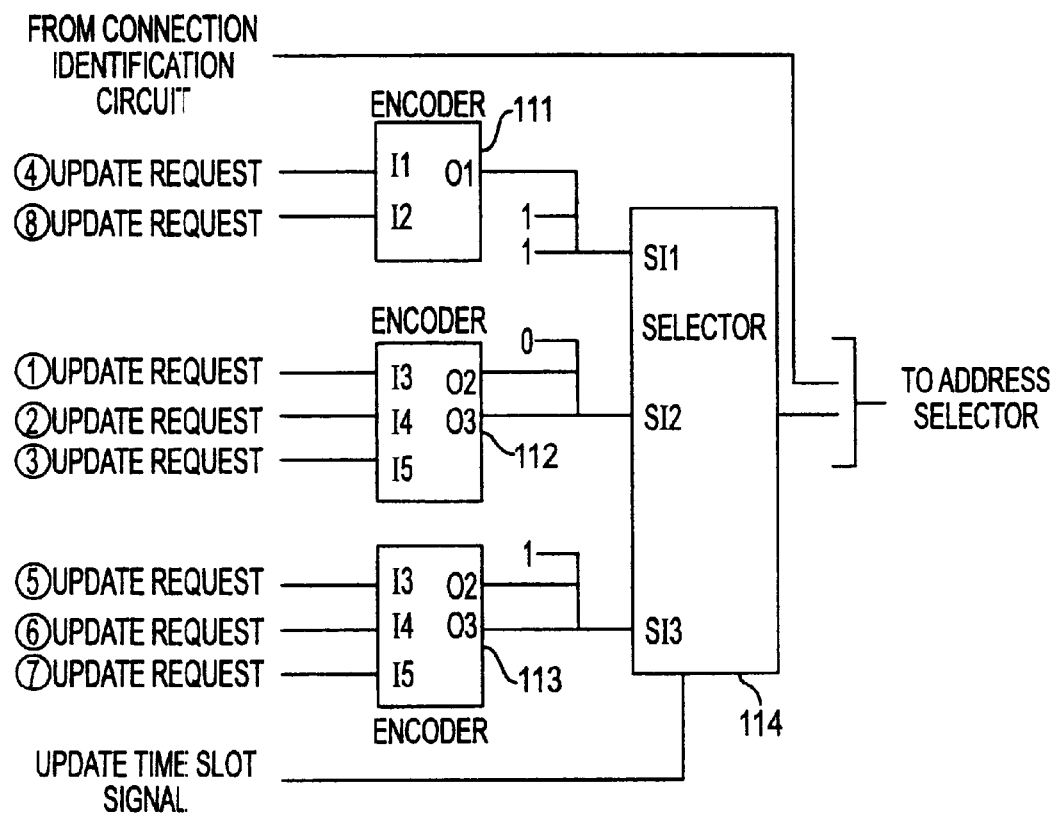
FIG. 29 shows another configuration of the address generation circuit.

FIG. 29 shows an exemplary arrangement of the address generation circuit 98 in the ATM connection quality measurement device. Encoders 111, 112 and 113 and a selector 114 in FIG. 29 correspond to the address adjustment circuit 101 of FIG. 24.

In FIG. 29, suppose that, when the network data collection device 93 makes requests to update data items, the corresponding update request signals are set to logic 1. The update requests for data items (1) to (8) are respectively connected to inputs I1 and I2 of the encoder 111, inputs I3, I4 and I5 of the encoder 112, and inputs I3, I4 and I5 of the encoder 113.

Figure 30:
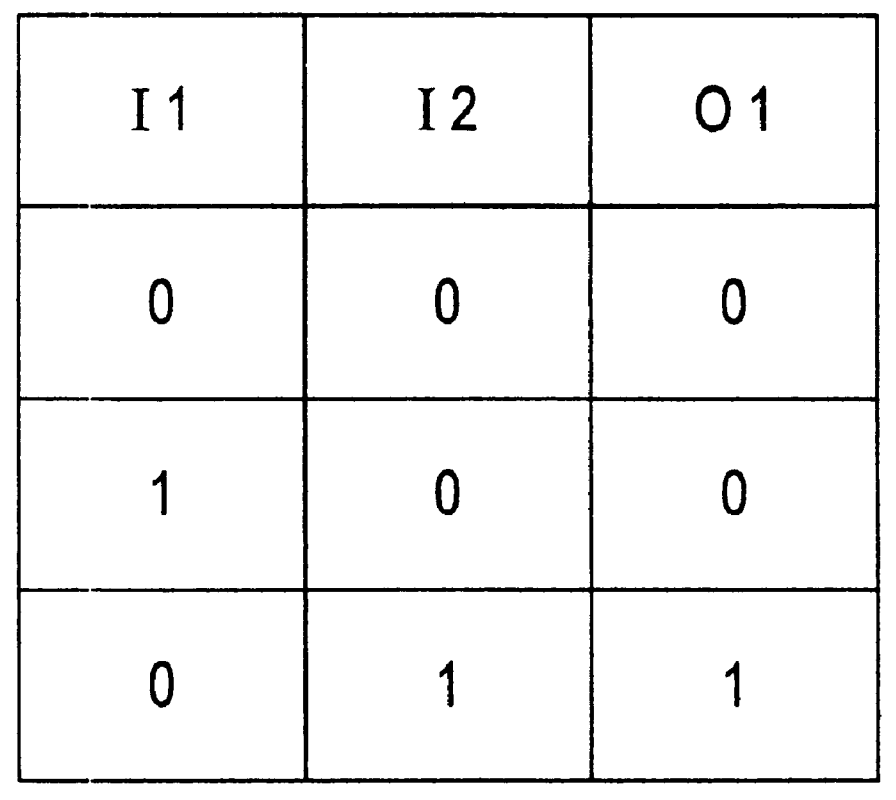

The inputs I1 and I2 and the output O1 of the encoder 111 are related as shown in FIG. 30. The output O1 goes to logic 0 when I1=I2=0 and when I1=1 and I2=0. The output O1 goes to logic 1 when I1=0 and I2=1. Since the update requests for items (4) and (8) are not made simultaneously, the inputs I1 and I2 will not go to logic 1 simultaneously.

Figure 31:
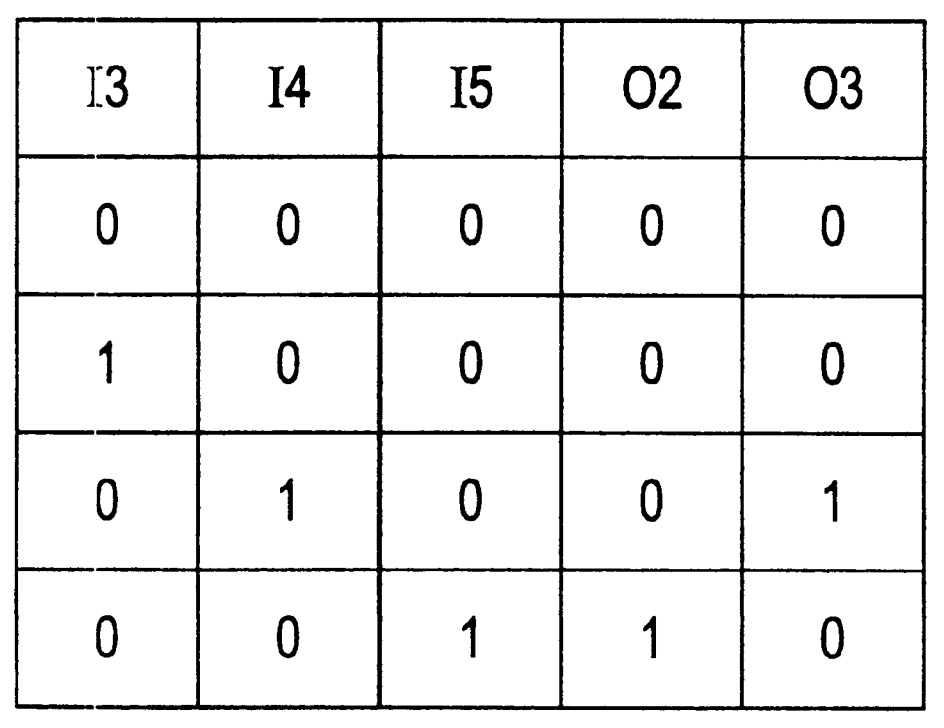

The inputs I3, I4 and I5 and outputs O2 and O3 of each of the encoders 112 and 113 are related as shown in FIG. 31. Both the outputs O2 ad O3 go to logic 0 when I3=I4=I5=0 and when I3=1 and I4=I5=0. The outputs O2 and O3 go to logic 0 and logic 1, respectively, when I3=0, I4=1, and I5=0. The outputs O2 and O3 go to logic 1 and logic 0, respectively, when I3=I4=0 and I5=1.

Two or more of the update requests for items (1), (2) and (3) will not go to logic 1 simultaneously and likewise, two or more of update requests for items (5), (6) and (7) will not go to logic 1 simultaneously; thus, two or more of inputs I3, I4 and I5 will not go to logic 1 simultaneously.

The output O1 of the encoder 111 is applied to the input SI1 of the selector 114 together with two signals at logic 1. The outputs O2 and O3 of the encoder 112 are applied to the input SI2 of the selector 114 together with a signal at logic 0, and the outputs O2 and O3 of the encoder 113 are applied to the input SI3 of the selector 114 together with a signal at logic 1.

In response to the value of an update time slot signal from the network data collection device, the selector 114 selects one of the inputs SI1, SI2 and SI3 for application to the address selector 94.

For example, when access to data item (4) or (8) is made, the update time slot signal becomes 00, so that the input SI1 is selected. When access to data item (1), (2) or (3) is made, the time slot signal becomes 01, so that the input SI2 is selected. When data item (5), (6) or (7) is accessed, the time slot signal becomes 10, so that the input SI3 is selected.

An access address is generated from an output of the selector 114 and a VPI output from the connection identification circuit 91 and applied to the address selector 94.

For example, when data item (4) is updated, the input SI1 is selected, so that the selector output becomes 011. For the VPI=0 ATM connection, the address to the address selector 94 will be 0011 (=3), which points to the address 3 of the statistical information memory 97 as shown in FIG. 27.

Likewise, when data item (8) is selected, the selector input SI1 is selected, so that the selector output becomes 111 (=7). For data item (1), (2) or (3), the input SI2 is selected. In this case, the selector output will be 000 for data item (1), 001 for data item (2), or 010 for data item (3). For data item (5), (6) or (7), the selector input SI3 is selected, so that the selector output is 100, 101, or 110.

The access adjustment circuit 99 in the ATM connection quality measurement device may be configured as in FIG. 25.

Next, an ATM cell accounting device which is another embodiment of the network data collection device will be described with reference to FIGS. 32A, 32B, and 33.

The ATM cell accounting device which provides an ATM-connection meter rate accounting capability counts cells flowing into the ATM switching unit for each ATM connection and presents the information to the call processing processor 56 via the line control processor 55.

Here, network data items the ATM cell accounting device collects for each ATM connection include the following items (1) to (8):

(1) The number of CLP=0 user cells that pass through the ATM switching unit.

(2) The number of CLP=1 user cells that pass through the ATM switching unit.

(3) The number of CLP=0 OAM cells that pass through the ATM switching unit.

(4) The number of CLP=1 OAM cells that pass through the ATM switching unit.

(5) The number of CLP=0 user cells that break UPC.
(6) The number of CLP=1 user cells that break UPC.
(7) The number of CLP=0 OAM cells that break UPC.
(8) The number of CLP=1 OAM cells that break UPC.

The CLP (Cell Loss Priority) in items (1) to (4) represents cell-discarding priorities at the time cells are congested in buffers in the ATM switching unit. The CLP=0 cells are rarely discarded even at times of congestion and receive high-quality services; thus, the charge therefore is high. On the other hand, the CLP=1 cells tend to be discarded at times of congestion and hence the charge is relatively low.

The UPC (Usage Parameter Control) in items (5) and (6) is a system which forces each subscriber to declare the cell-rate bandwidth, and counts cells that exceed the declared bandwidth as UPC disagreement cells.

The statistical information memory (accounting memory) 97 in the ATM-cell accounting device that stores such statistical information may be configured as in FIG. 27. In the accounting memory, the number of incoming cells is stored for each of the eight attributes indicated in (1) to (8).

Here, each incoming cell has one of the attributes of CLP=0 user cell, CLP=1 user cell, CLP=0 OAM cell, and CLP=1 OAM cell. Thus, there is no possibility of simultaneous updating of two or more of the items (1) to (4). For the same reason, there is no possibility of simultaneous updating of two or more of the items (5) to (8).

Figure 32A:
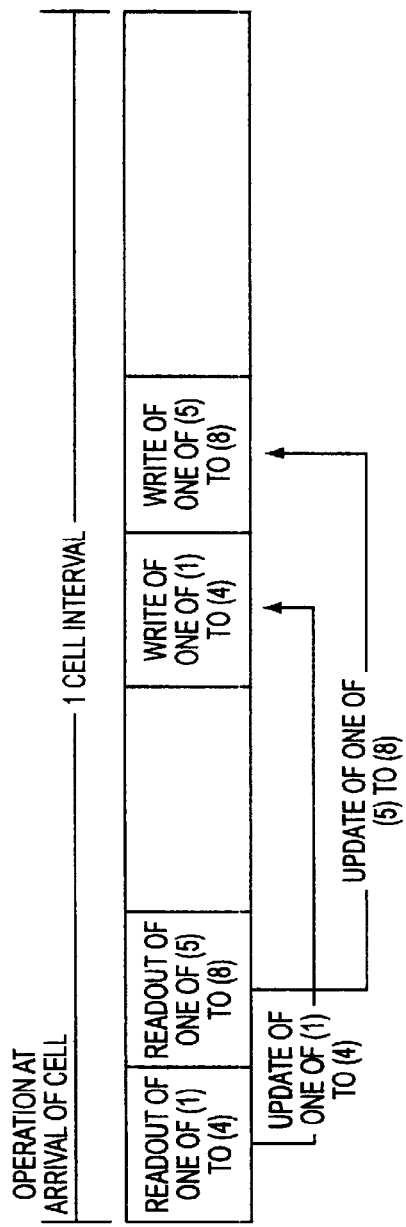
FIGS. 32A and 32B show memory accesses in an accounting device.
Figure 32B:
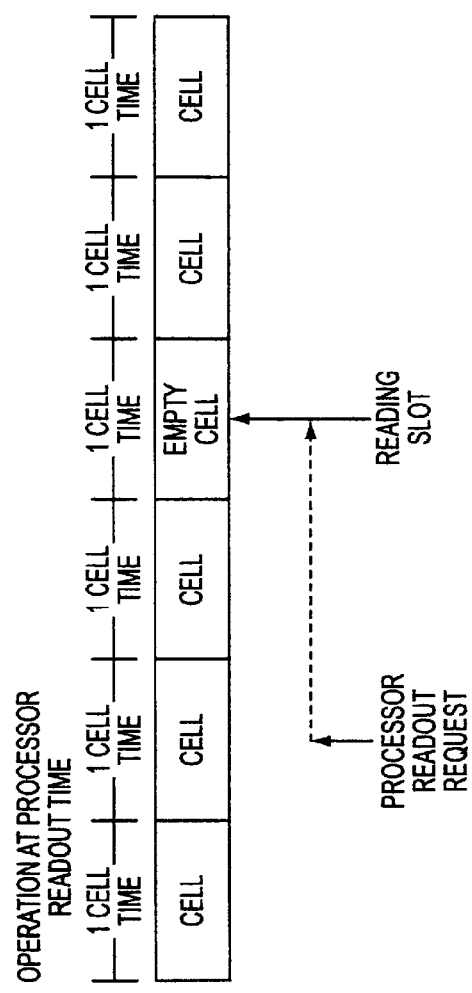

An access cycle for the statistical information memory 97 can be set as shown in FIGS. 32A or 32B. At the arrival of a cell, a maximum of four accesses is made within one cell interval as shown in FIG. 32A.

One of data items (1) to (4) is read from the statistical information memory 97 first and one of data items (5) to (8) is read next. Then, updated data for one of items (1) to (4) and updated data for one of items (5) to (8) are written into the information memory in sequence.

When a readout request is made by the line control processor 55, data is read not in a cell slot for a user cell or OAM cell that involves data updating but in a slot for a cell, such as an empty cell, in which data need not be updated, as shown in FIG. 32B.

In this way, it becomes possible to reduce the number of accesses to the statistical information memory 97.

Figure 33:
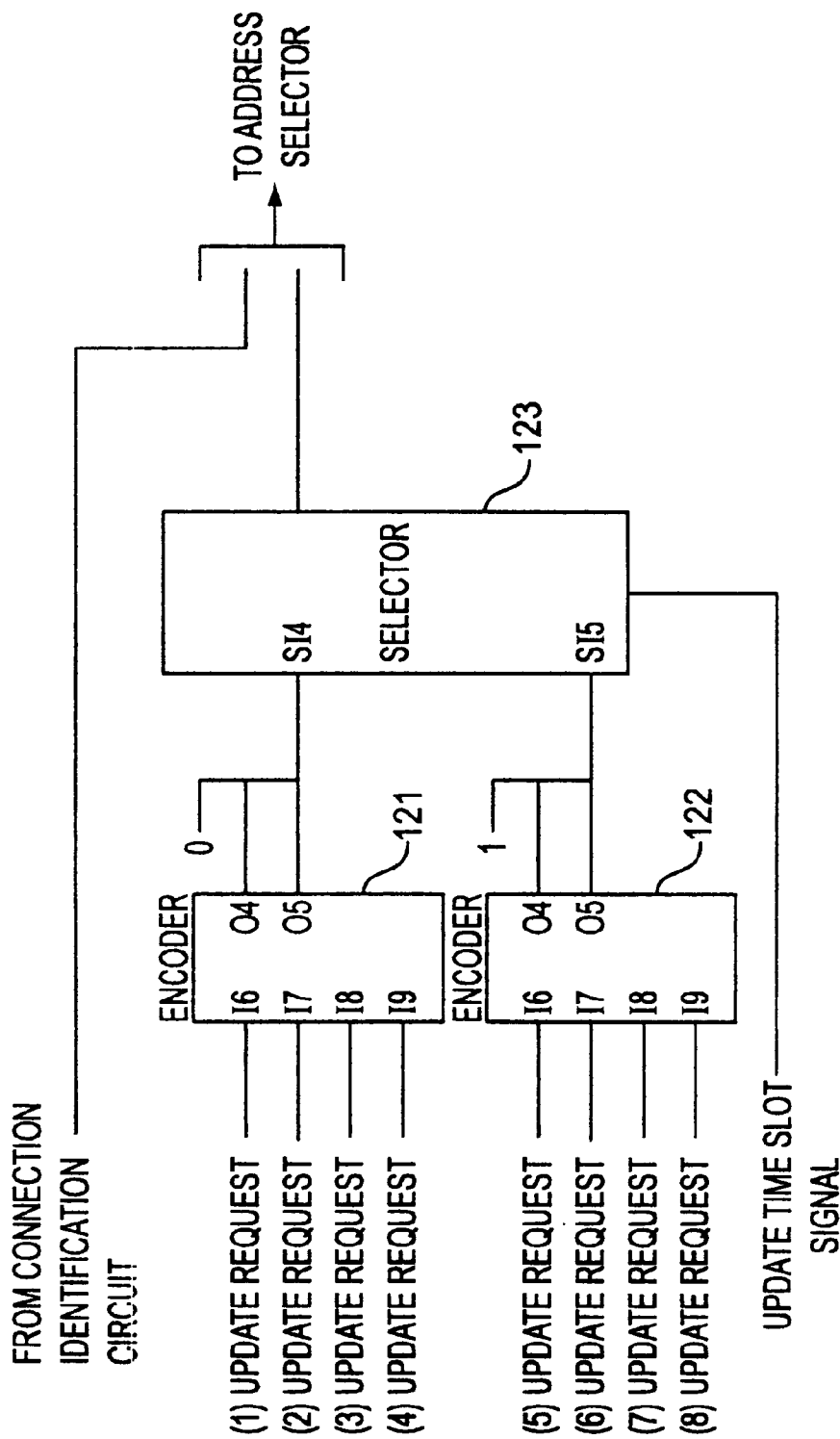
FIG. 33 shows a further configuration of the address generation circuit.

FIG. 33 shows an exemplary arrangement of the address generation circuit 98 used in the ATM cell accounting device. Encoders 121 and 122 and a selector 123 correspond to the address adjustment circuit 101 of FIG. 24.

In FIG. 33, update requests for items (1) to (8) are received from the network data collection device 93 as with FIG. 29. Update requests for items (1), (2), (3) and (4) are applied to inputs I6, I7, I8 and I9 of the encoder 121, respectively, and update requests for items (5), (6), (7) and (8) are applied to inputs I6, I7, I8 and I9 of the encoder 122, respectively.

The inputs I6, I7, I8 and I9 and the outputs O4 and O5 of each of the encoders 121 and 122 are related as shown in FIG. 34. When I6=I7=I8=I9=0 and when I6=1 and I7=I8=I9=0, both the outputs O4 and O5 go to logic 0.

When I6=0, I7=1, and I8=I9=0, the outputs O4 and O5 go to logic 0 and logic 1, respectively. When I6=I7=0, I8=1, and I9=0, the outputs O4 and O5 go to logic 1 and logic 0, respectively. When I6=I7=I8=0 and I9=1, both the outputs O4 and O5 go to logic 1.

There is no possibility that update requests for two or more of the items (1) to (4) may go to logic 1 simultaneously. The same is true of the items (5) to (8). Thus, there is no possibility that two or more of the inputs I6, I7, I8 and I9 may go to logic 1 simultaneously.

The outputs O4 and O5 of the encoder 121 are applied to the input SI4 of the selector 123 together with a signal at logic 0. The outputs O4 and O5 of the encoder 122 are applied to the input SI5 of the selector together with a signal at logic 1.

According to the value of an update time slot signal from the network data collection device 93, the selector 123 selects either of the inputs SI4 and SI5 and outputs it to the address selector 94.

For example, for access to one of data items (1) to (4), the update time slot signal goes to logic 0, so that the input SI4 is selected. For access to one of data items (5) to (8), the time slot signal goes to logic 1, so that the input SI5 is selected.

An output of the selector 123 and a VPI output from the connection identification circuit 91 provide an access address, which is applied to the address selector 94.

For example, when data item (1) is updated, the input SI4 is selected, so that the selector output becomes 000. For data items (2), (3), or (4), the selector output will be 001, 010, or 011, respectively. For data items (5), (6), (7), or (8), the selector output will be 100, 101, 110, or 111, respectively, with the input SI5 being selected.

The access adjustment circuit 99 used in the ATM cell accounting device may be configured as in FIG. 25.

As described above, the present invention reduces the number of accesses to a statistical information memory on the arrival of a cell. Therefore, a network data collection device can be constructed using inexpensive memory units which are slower in access speed than conventional statistical information memories.

In comparison with the case where the statistical information memory is expanded in the bit direction, a smaller number of statistical information memory units are required.

The statistical information memory of FIGS. 18, 21 and 27 stores network data for each VPI-identified ATM connection. However, in the present invention the ATM connection may be defined in any other way. The statistical information memory may store network data for each ATM connection thus defined.

For example, ATM connections identified by VPIs and VCIs can be handled in the same way.

The present invention allows information to be efficiently collected for each of the connections set up on a communications network that transmits cells such as ATM cells.

More specifically, the present invention allows information about alarm states and the quality of connections and characteristics of passing cells on a communications network to be held at low cost and in an efficient manner. Moreover, the information thus held can be read efficiently with notification to a call processing processor in an ATM switching unit.

Furthermore, the period of time that is used as the alarm state transition condition can be counted accurately.

Although the preferred embodiments of the present invention have been described, it is apparent that the invention may be practiced or embodied in still other ways without departing the scope and spirit thereof.

What is claimed is:

1. A device for collecting and holding information about communications cells that pass through a switching unit in a communications network comprising:

storage means for storing the number of incoming cells in each address determined according to cell attributes, wherein updates of the number of incoming cells for different cell attributes do not occur simultaneously;

collection means for identifying the connection associated with an incoming cell and extracting connection identifiers and attributes of incoming cells;

update means for updating the number of cells in said storage means which corresponds to the attribute of an incoming cell and not updating the numbers of cells in said storage means which correspond to different attributes; and readout means for reading the number of incoming cells from said storage means.

2. The device according to claim 1, wherein said information collection device is used as a cell accounting device which provides meter rate accounting capabilities for each of connections.

3. A device which collects and holds information related to communications cells that pass through a switching unit in a communications network comprising:

storage means for storing the number of incoming cells in each address determined according to cell attributers, wherein updates of the number of incoming cells for different cell attributes do not occur simultaneously;

collection means for extracting connection identifiers and attributes of incoming cells;

update means for, when it is required to update the number of incoming cells by cell attribute stored in said storage means, updating the number of incoming cells by cell attribute stored in said storage means using connection identifier and attributes of incoming cells extracted by said collection means; and readout means for reading the number of incoming cells when there is no need for updating the number of incoming cells in said storage means.

4. The device according to claim 3, wherein said information collection device is used as a cell accounting device which provides meter rate accounting capabilities for each of connections.

5. A method for collecting and holding information about communication cells that pass through a switching unit in a communications network comprising the steps of:

storing the number of incoming cells in each address determined according to cell attributes, wherein updates of the number of incoming cells for different cell attributes do not occur simultaneously;

identifying a connection associated with an incoming cell and extracting connection identifiers and attributes of incoming cells;

updating the number of cells stored in the storing step which corresponds to the attribute of an incoming cell and not updating the numbers of cells stored in the storing step which correspond to different attributes; and reading the number of incoming cells stored in the storing step.

6. A method for collecting and holding information related to communications cells that pass through a switching unit in a communications network comprising the steps of:

storing the number of incoming cells in each address determined according to cell attributes, wherein updates of the number of incoming cells for different cell attributes do not occur simultaneously;

extracting connection identifiers and attributes of incoming cells;

when it is required to update the number of incoming cells by cell attributes stored in the storing step, updating the number of incoming cells by cell attribute stored in the storing step using connection identifier and attributes of incoming cells extracted in the extracting step; and reading the number of incoming cells when there is no need for updating the number of incoming cells stored in the storing step.

* * * * *